United States Patent
Kaneko et al.

(10) Patent No.: US 9,313,365 B2
(45) Date of Patent: Apr. 12, 2016

(54) IMAGE PROCESSING APPARATUS, IMAGE PROCESSING METHOD, AND IMAGE RECORDING APPARATUS

(71) Applicant: CANON KABUSHIKI KAISHA, Tokyo (JP)

(72) Inventors: Takumi Kaneko, Tokyo (JP); Rie Takekoshi, Kawasaki (JP); Noboru Kunimine, Tokyo (JP); Ayumi Hirakawa, Kawasaki (JP); Keita Ishimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/678,734

(22) Filed: Apr. 3, 2015

(65) Prior Publication Data

US 2015/0283821 A1    Oct. 8, 2015

(30) Foreign Application Priority Data

Apr. 7, 2014 (JP) .................. 2014-079019

(51) Int. Cl.
*B41J 2/15* (2006.01)
*H04N 1/405* (2006.01)
*B41J 2/205* (2006.01)

(52) U.S. Cl.
CPC ............. *H04N 1/405* (2013.01); *B41J 2/2054* (2013.01)

(58) Field of Classification Search
CPC ........ B41J 2/21; B41J 2/2052; H04N 1/4051; H04N 1/4078; H04N 1/60; H04N 1/605; H04N 1/00082
See application file for complete search history.

(56) References Cited

U.S. PATENT DOCUMENTS

| 7,948,652 B2* | 5/2011 | Noguchi | H04N 1/4055 347/12 |
| 8,262,185 B2* | 9/2012 | Komano | H04N 1/128 347/15 |
| 8,550,595 B2* | 10/2013 | Kaneko | B41J 2/2139 347/15 |
| 2007/0097164 A1 | 5/2007 | Marumoto | |
| 2013/0300788 A1 | 11/2013 | Konno | |

* cited by examiner

*Primary Examiner* — Lamson Nguyen
(74) *Attorney, Agent, or Firm* — Canon USA Inc. IP Division

(57) ABSTRACT

In a case where ink having a relatively high dot height is ejected a small amount, binary data corresponding to ink having a relatively low dot height is quantized so that dot adjacency is increased.

17 Claims, 28 Drawing Sheets

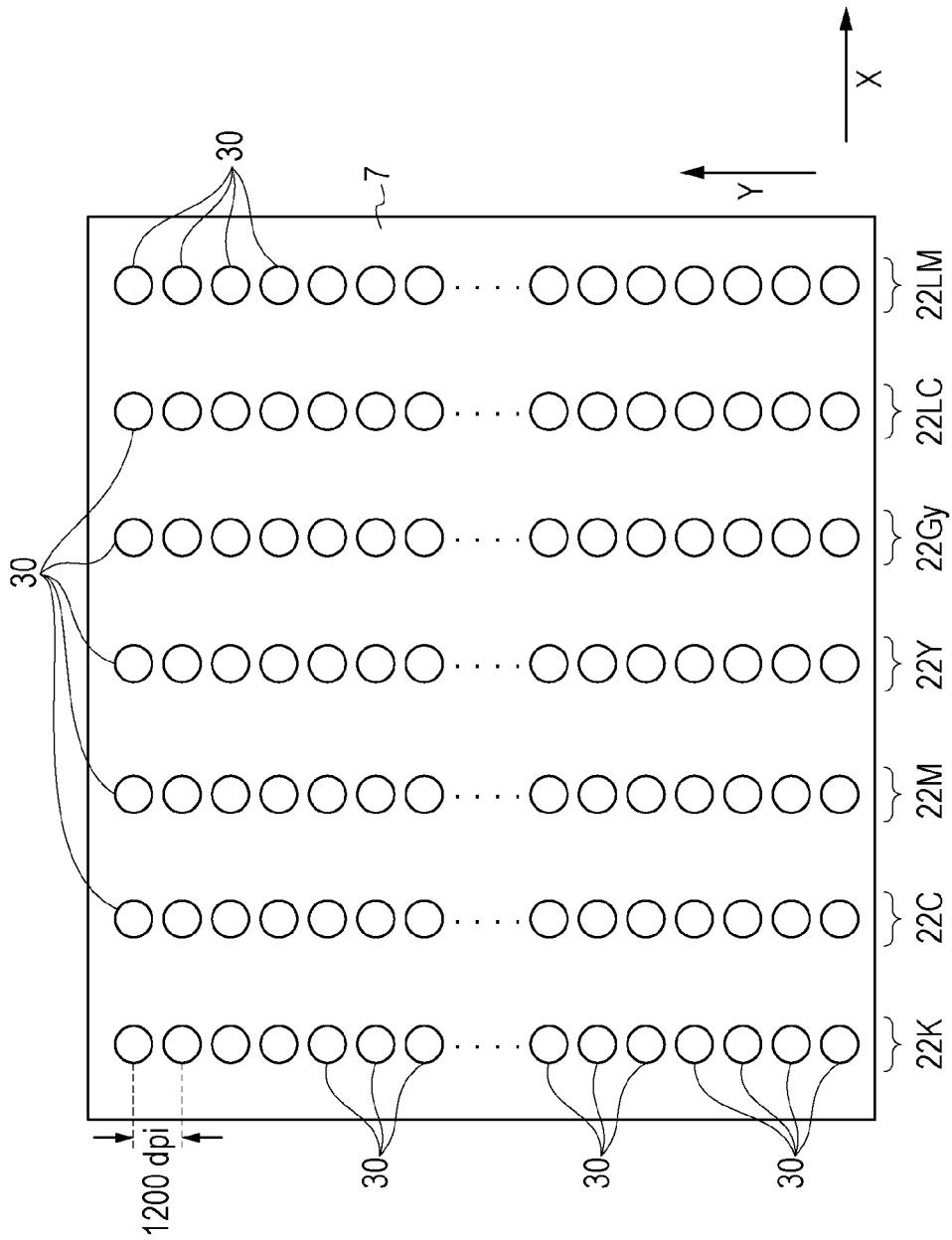

FIG. 6A
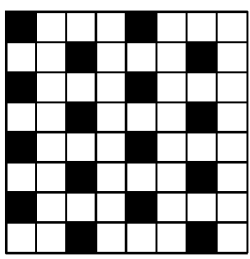
FIG. 6B
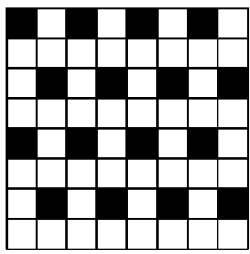
FIG. 6C1  FIG. 6C2  FIG. 6C3  FIG. 6C4
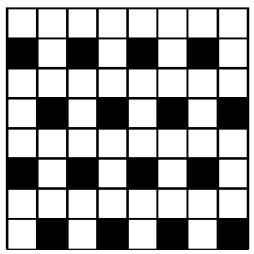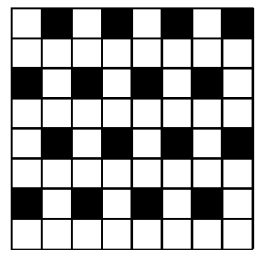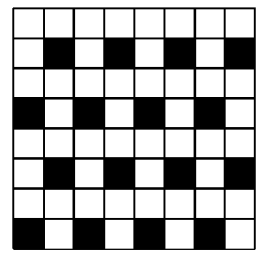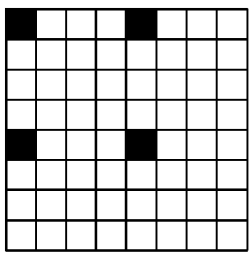
FIG. 6D1  FIG. 6D2  FIG. 6D3  FIG. 6D4
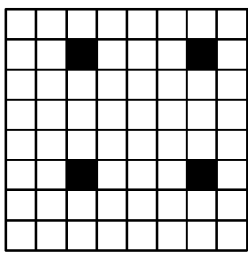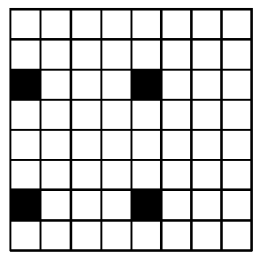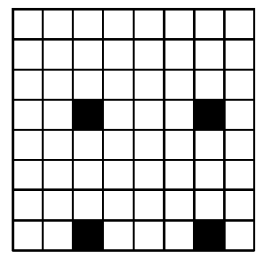

ONE LAYER

ONE LAYER

TWO LAYERS

TWO LAYERS   ONE LAYER

TWO LAYERS   ONE LAYER

THREE LAYERS   FOUR LAYERS   THREE LAYERS

FIG. 16A

| 9 | 143 | 101 | 229 | 40 | 195 | 110 | 243 |
|---|---|---|---|---|---|---|---|
| 93 | 163 | 28 | 168 | 94 | 245 | 58 | 236 |
| 7 | 183 | 90 | 179 | 43 | 220 | 107 | 131 |
| 87 | 160 | 54 | 162 | 99 | 249 | 15 | 180 |
| 9 | 143 | 101 | 229 | 40 | 195 | 110 | 243 |
| 93 | 163 | 28 | 168 | 94 | 245 | 58 | 236 |
| 7 | 183 | 90 | 179 | 43 | 220 | 107 | 131 |
| 87 | 160 | 54 | 162 | 99 | 249 | 15 | 180 |

FIG. 16B

| 243 | 143 | 93 | 94 | 131 | 195 | 28 | 9 |
|---|---|---|---|---|---|---|---|
| 168 | 163 | 7 | 15 | 229 | 245 | 101 | 107 |
| 179 | 183 | 90 | 110 | 236 | 220 | 40 | 43 |
| 162 | 160 | 54 | 58 | 180 | 249 | 87 | 99 |
| 243 | 143 | 93 | 94 | 131 | 195 | 28 | 9 |
| 168 | 163 | 7 | 15 | 229 | 245 | 101 | 107 |
| 179 | 183 | 90 | 110 | 236 | 220 | 40 | 43 |
| 162 | 160 | 54 | 58 | 180 | 249 | 87 | 99 |

FIG. 23

|   |     |    |     |    |     | E1  | E2  |
|---|-----|----|-----|----|-----|-----|-----|
| E3|     |    | E4  |    |     |     |     |
| 7 | 143 | 93 | 162 | 99 | 195 | 28  | 9   |
|168| 163 |243 | 15  |229 | 245 | 101 | 107 |
| 40| 183 | 90 | 110 |236 | 43  | 179 | 220 |
| 94| 160 | 54 | 58  |180 | 249 | 87  | 131 |
| 7 | 143 | 93 | 162 | 99 | 195 | 28  | 9   |
|168| 163 |243 | 15  |229 | 245 | 101 | 107 |
| 40| 183 | 90 | 110 |236 | 43  | 179 | 220 |
| 94| 160 | 54 | 58  |180 | 249 | 87  | 131 |

E5, E7, E8 label the left side; E6 labels the right side.

IMAGE PROCESSING APPARATUS, IMAGE PROCESSING METHOD, AND IMAGE RECORDING APPARATUS

BACKGROUND OF THE INVENTION

1. Field of the Invention

The present disclosure generally relates to image processing and, more particularly, to an image processing apparatus, an image processing method, and an image recording apparatus.

2. Description of the Related Art

There has been available a recording scheme which causes a recording head having a plurality of arrays of ejection ports for ejecting ink to eject ink while scanning across a recording medium to perform a scanning and recording operation to form an image on the recording medium.

In such a recording scheme, one of the generally applicable techniques for quantization of multi-valued data of an image is the so-called dithering technique. In the dithering technique, a dither pattern in which threshold values are set for individual pixels to determine ejection or non-ejection of ink to each of a plurality of pixel areas is used for quantization. U.S. Patent Application Publication No. 2007/0097164 discloses that a dither pattern in which threshold values are set so that respective threshold values for a plurality of pixels have a small number of low-frequency components to reduce the graininess of an image to be obtained is used for quantization.

Meanwhile, various types of ink and recording media have been used in recent years for the recording method described above. One known combination of ink and recording medium is the use of ink including a pigment in combination with a recording medium having low ink permeability. The use of such ink and recording medium to record an image may cause the occurrence of thin-film interference since the ink is fixed to a surface of the recording medium, potentially resulting in a change in the color tint of an image to be obtained. It is known that thin-film interference occurs more markedly when ink is ejected a relatively smaller amount and when an ink layer formed on the recording medium is thinner. U.S. Patent Application Publication No. 2013/0300788 discloses that when ink is ejected a small amount, the amount of image-quality improving liquid to be applied relatively increases to increase surface irregularities of an ink layer to suppress the occurrence of thin-film interference.

However, recording using the method disclosed in U.S. Patent Application Publication No. 2013/0300788 may raise an issue of insufficient suppression of the occurrence of thin-film interference.

Such an issue will be described in detail hereinbelow.

FIG. 1 is a diagram depicting a change in color tint due to thin-film interference.

Here, consideration will be given to the case where, for simplicity, light (incident light) 71 enters an ink layer (thin film) 70 having a dot height d, which is formed on a recording medium 3, at an angle of incidence of 45°, and reflected light produced by the specular reflection of the incident light 71 is observed. The reflected light is obtained by combining a reflected light beam 73 produced by the specular reflection of the incident light 71 at a surface of the recording medium 3 after penetrating the ink layer 70, and a reflected light beam 72 produced by the specular reflection of the incident light 71 at a surface of the ink layer 70. There is an optical path difference between the reflected light beam 72 and the reflected light beam 73 over a period from the entry of the incident light 71 to the observation of the reflected light. It is known that the value of the optical path difference can be approximated to be about 2d when the dot height d of the ink layer 70 is sufficiently low.

From the discussion described above, it is understood that when the dot height d of the ink layer 70 is low (the ink layer 70 is thin), the optical path difference between the reflected light beam 72 and the reflected light beam 73 is short. This causes interference, such as strengthening or weakening, between the reflected light beam 72 and the reflected light beam 73. Specifically, if the optical path difference, which is given by 2d, is equal to an integer (m) multiple ($2d=m\lambda$) of the wavelength $\lambda$ of the incident light 71, the reflected light beam 72 and the reflected light beam 73 strengthen each other. If the optical path difference, which is given by 2d, is equal to the sum of an integer multiple of the wavelength $\lambda$ of the incident light 71 and one-half the wavelength $\lambda$ ($2d=(m+\frac{1}{2})\lambda$), the reflected light beam 72 and the reflected light beam 73 weaken each other. When interference of only either strengthening or weakening occurs, the intensity of the reflected light to be observed is different from the intensity of the incident light 71. Consequently, the color tint of an image changes.

As described above, thin-film interference occurs markedly for an ink layer having a low dot height. An examination performed by the inventors reveals that if different types of ink are used, the dot heights might differ even though the amounts of ejected ink are the same. The examination also reveals that the degree of occurrence of thin-film interference changes depending on the type of ink to be used.

FIGS. 2A to 2C are diagrams depicting the degrees of occurrence of thin-film interference when different types of ink are used. FIG. 2A is a diagram illustrating the degree of occurrence of thin-film interference when ink having a relatively low dot height when applied to a recording medium is used. FIG. 2B is a diagram illustrating the degree of occurrence of thin-film interference when ink having a relatively high dot height when applied to a recording medium is used. FIG. 2C is a diagram illustrating the degree of occurrence of thin-film interference when ink having a relatively low dot height and ink having a relatively high dot height are both used. Note that, in the illustrations of FIGS. 2A, 2B, and 2C, the amounts of ink ejected is the same.

As described above, thin-film interference occurs markedly when ink having a relatively low dot height ($d_1$) is used. Since an ink layer 74 is formed to be comparatively flat, interference occurs in substantially the same form regardless of where incident light enters on the ink layer 74. Thus, in the ink layer 74 illustrated in FIG. 2A, the color tint of an image to be observed markedly changes.

In contrast, when ink having a relatively high dot height ($d_2$) is used to form an ink layer 75, as illustrated in FIG. 2B, the optical path difference between reflected light beams is also relatively long. Accordingly, a plurality of kinds of interference, such as strengthening and weakening, occur between the reflected light beams. As a result, a change in color tint that is biased in a specific direction does not occur. If the ink layer 75 has a high dot height to some extent, the ink layer 75 will form a projection, as illustrated in FIG. 2B. Thus, the dot height is equal to $d_2$ around the center of the ink layer 75, whereas the dot height is equal to a value lower than $d_2$ around the ends of the ink layer 75. In the manner described above, the optical path difference between reflected light beams differs depending on the position of incidence of incident light, and thus various kinds of interference occur depending on the position. Accordingly, when ink having a relatively high dot height is used, reflected light beams interfere with one another in a multiplex manner, resulting in the change in the color tint of an image to be observed becoming less noticeable.

As illustrated in FIG. 2C, when both ink having a relatively low dot height and ink having a relatively high dot height are used, a change in color tint due to thin-film interference occurs on the ink layer 74 formed by the ink having a relatively low dot height in a manner similar to that in the image illustrated in FIG. 2A. On the ink layer 75 formed by the ink having a relatively high dot height, in contrast, reflected light beams interfere with one another in a multiplex manner, as in the image illustrated in FIG. 2B. The multiplex interference of reflected light beams on the ink layer 75 will suppress the effect of thin-film interference on the ink layer 74, resulting in a reduced change in the color tint of the entire image, compared to the image illustrated in FIG. 2A.

As described above, the examination performed by the inventors reveals that the change in color tint due to thin-film interference may differ depending on the dot height of ink to be used, even if the same amount of ink is ejected per unit area on a recording medium. Specifically, a change in color tint caused by thin-film interference is more likely to occur on an image formed by ink whose dot height is low when ink having a high dot height is ejected a relatively small amount than on an image formed by ink whose dot height is low when ink having a high dot height is ejected a relatively large amount.

SUMMARY OF THE INVENTION

Accordingly, an aspect of the present disclosure provides recording with a reduced change in color tint due to thin-film interference on a recording medium when multiple types of ink having different dot heights are used.

An embodiment of the present disclosure provides an image processing apparatus for processing multi-valued data corresponding to an image to be recorded in a unit area on a recording medium to record an image in the unit area during each of a plurality of relative scans of a recording head across the unit area in a scanning direction, the recording head being configured to eject at least ink of a first color containing a pigment and ink of a second color containing a pigment, in accordance with recording data that specifies ejection or non-ejection of each of the ink of the first color and the ink of the second color to each of a plurality of pixel areas each having a plurality of pixels within the unit area. The image processing apparatus includes an acquisition unit configured to acquire information concerning gradation values in the multi-valued data, each of the gradation values corresponding to one of the ink of the first color and the ink of the second color; and a quantization unit configured to quantize the multi-valued data to generate binary data that specifies, for each of the plurality of pixels, ejection or non-ejection of each of the ink of the first color and the ink of the second color to each of the plurality of pixel areas. A dot formed by applying the ink of the second color to the recording medium a predetermined amount has a lower height than a dot formed by applying the ink of the first color to the recording medium the predetermined amount. The quantization unit quantizes the multi-valued data corresponding to the ink of the second color so that an average of numbers of adjacent pixels among pixels within the unit area for which ejection of the ink of the second color is specified by the binary data in a case where the gradation value in the multi-valued data corresponding to the ink of the second color, which is acquired by the acquisition unit, is a first value and in a case where the gradation value in the multi-valued data corresponding to the ink of the first color, which is acquired by the acquisition unit, is a second value is larger than an average of numbers of adjacent pixels among pixels for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is a third value higher than the second value.

Further features of the present disclosure will become apparent from the following description of exemplary embodiments with reference to the attached drawings.

BRIEF DESCRIPTION OF THE DRAWINGS

FIG. 5 is a schematic diagram of a recording head according to the first embodiment.

FIGS. 6A, 6B, 6C1 to 6C4, and 6D1 to 6D4 are diagrams depicting a dither pattern and a mask pattern.

FIGS. 16A and 16B are diagrams illustrating a dither pattern used in the first and second embodiments.

FIG. 23 is a diagram illustrating a dither pattern used in the third embodiment.

FIGS. 25A and 25B are diagrams illustrating index patterns applied in the fourth embodiment.

DESCRIPTION OF THE EMBODIMENTS

A first embodiment of the present disclosure will be described in detail hereinafter with reference to the drawings.

First Embodiment

Figure 3:
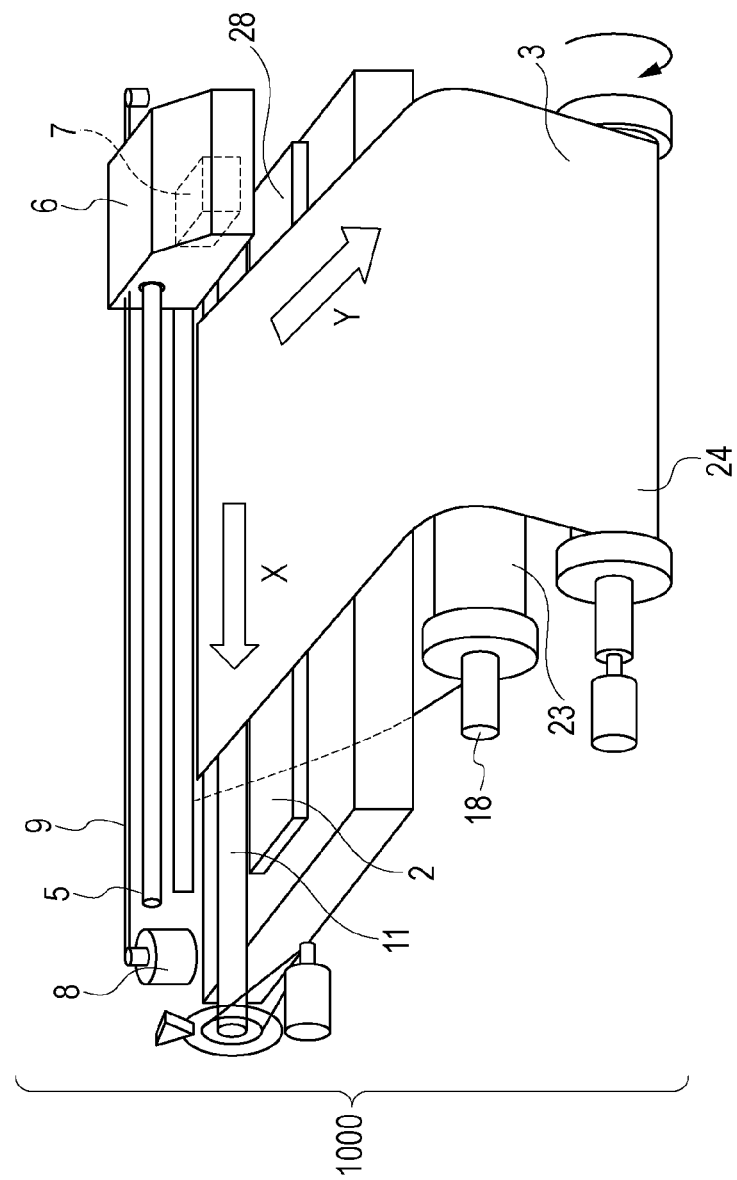
FIG. 3 is a perspective view of an image recording apparatus according to a first embodiment.
Figure 4:
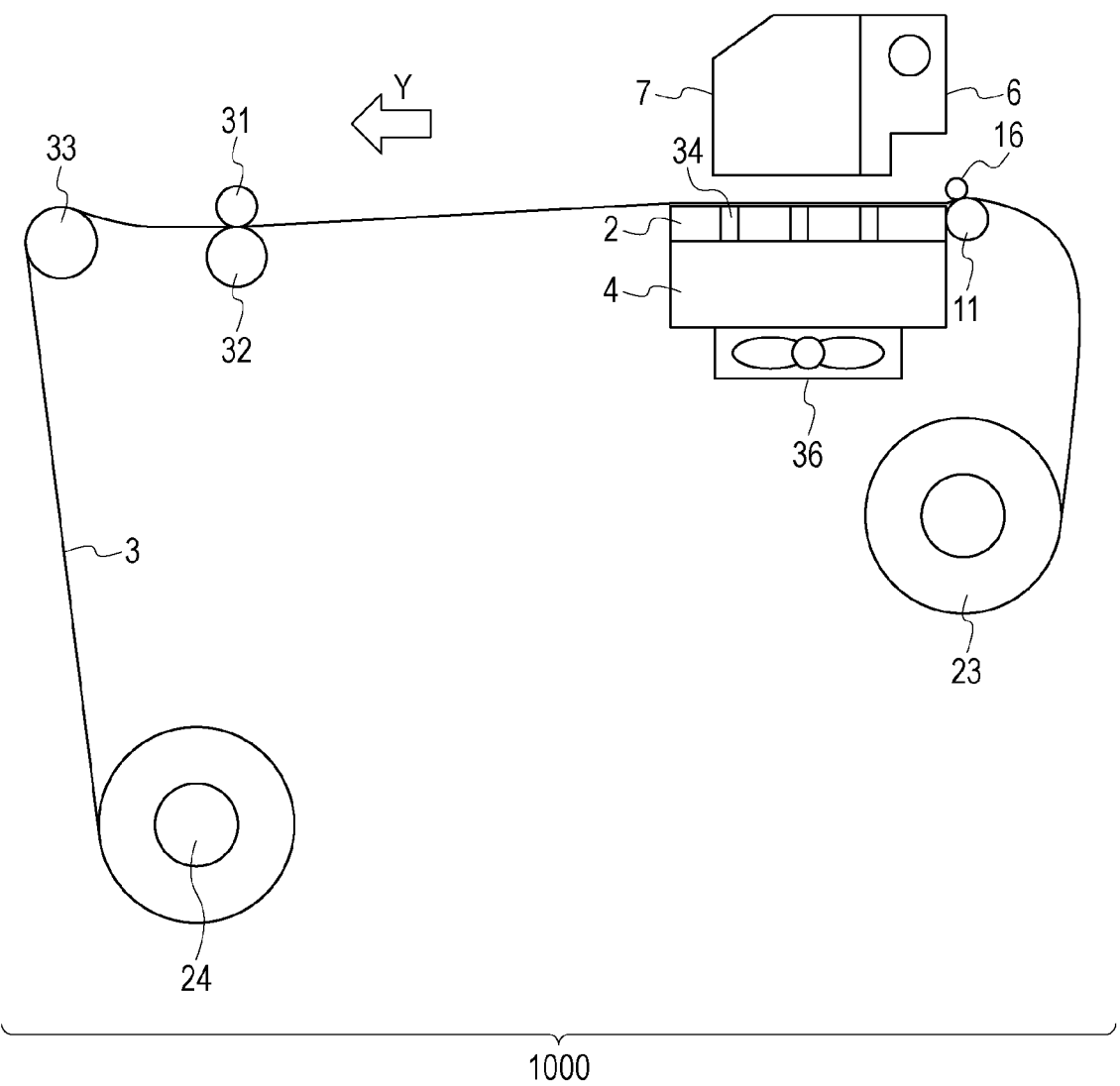
FIG. 4 is a side view of an image recording apparatus according to the first embodiment.

FIG. 3 is a partial perspective view illustrating the internal configuration of an image recording apparatus 1000 according to a first embodiment of the present disclosure. FIG. 4 is a partial side view illustrating the internal configuration of the image recording apparatus 1000 according to the first embodiment of the present disclosure.

The image recording apparatus 1000 has a platen 2 disposed thereinside. The platen 2 has a large number of suction holes 34 formed therein to suck a recording medium 3 so as to prevent the recording medium 3 from floating. The suction holes 34 communicate with a duct 4, and a suction fan 36 is placed beneath the duct 4. The suction fan 36 operates to adsorb the recording medium 3 onto the platen 2.

A carriage 6 is supported by a main rail 5 disposed so as to extend, and is configured to be capable of reciprocally moving in an X direction (scanning direction). The carriage 6 has an inkjet recording head 7 described below. The recording head 7 may be of any recording type such as a thermal jet type that employs a heating element, or a piezo type that employs a piezoelectric element. A carriage motor 8 is a drive source for driving the carriage 6 to move in the X direction, and the rotational driving force of the carriage motor 8 is transmitted to the carriage 6 by means of a belt 9.

The recording medium 3 is wound off from a medium 23 wound in a roll and is therefore fed. The recording medium 3 is conveyed in a Y direction (conveying direction) perpendicular to the X direction over the platen 2. A leading edge of the recording medium 3 is held between a pinch roller 16 and a conveying roller 11, and the conveying roller 11 is driven to convey the recording medium 3. The recording medium 3 is further held between a roller 31 and a discharge conveyor roller 32 downstream of the platen 2 in the Y direction. The recording medium 3 is further wound around a winding roller 24 via a turn roller 33.

FIG. 5 illustrates a recording head used in this embodiment.

The recording head 7 has seven ejection port arrays 22K, 22C, 22M, 22Y, 22Gy, 22Lc, and 22Lm configured to eject ink of black (K), cyan (C), magenta (M), yellow (Y), gray (Gy), light cyan (Lc), and light magenta (Lm), respectively. The ejection port arrays 22K, 22C, 22M, 22Y, 22Gy, 22Lc, and 22Lm are arranged parallel to one another in the X direction. Each of the ejection port arrays 22K, 22C, 22M, 22Y, 22Gy, 22Lc, and 22Lm has an array of 1280 ejection ports 30, each configured to eject ink droplets, in the Y direction (array direction) at a density of 1200 dots per inch (dpi). In this embodiment, the amount of ink ejected from each of the ejection ports 30 during a single ejection operation is approximately 4.5 pl.

The ejection port arrays 22K, 22C, 22M, 22Y, 22Gy, 22Lc, and 22Lm are connected to individual ink tanks (not illustrated) that store the corresponding types of ink, from which ink is supplied. The recording head 7 used in this embodiment and the ink tanks may be integrally formed or may be formed to be separable from each other.

Ink Composition

Ink used in this embodiment will be described in detail hereinafter.

In the following, "part(s)" and "%" are on a mass basis unless otherwise noted.

Preparation of Black Ink (1) Preparation of Dispersion Liquid

First, an anionic polymer P-1 [styrene/butyl acrylate/acrylic acid copolymer (polymerization ratio (weight ratio): 30/40/30), acid value: 202, weight-average molecular weight: 6500] is prepared, neutralized with an aqueous solution of potassium hydroxide, and then diluted with ion-exchanged water to yield a 10% by mass homogeneous aqueous solution of polymer.

Further, 600 g of the aqueous solution of polymer is mixed with 100 g of carbon black and 300 g of ion-exchanged water. After the mixture is mechanically stirred for a predetermined time, undispersed matter containing coarse particles is removed by centrifugation to yield a black dispersion liquid. The resulting black dispersion liquid has a pigment concentration of 10% by mass.

(2) Preparation of Ink

In the preparation of ink, the black dispersion liquid obtained above is used. The materials listed below are added to the black dispersion liquid to produce a predetermined concentration. After the materials are sufficiently stirred and mixed, the mixture is subjected to pressure filtration using a microfilter with a pore size of 2.5 μm (manufactured by FUJIFILM Corporation) to prepare pigment ink having a pigment concentration of 2.5% by mass.

Black dispersion liquid obtained above: 25 parts
Fluorinated surfactant: ZONYL® FSO-100 (manufactured by
DuPont): 0.05 parts
Glycerin: 10 parts
Triethylene glycol: 10 parts
Acetylene glycol EO adduct (manufactured by Kawaken Fine Chemicals Co., Ltd.): 0.5 parts
Triethanolamine: 0.5 parts
Ion-exchanged water: remainder Preparation of Cyan Ink (1) Preparation of Dispersion Liquid First, an AB block polymer having an acid value of 250 and a number-average molecular weight of 3000 is produced with benzyl acrylate and methacrylic acid as raw materials by a conventional process. The AB block polymer is neutralized with an aqueous solution of potassium hydroxide and then diluted with ion-exchanged water to yield a 50% by mass homogeneous aqueous solution of polymer.

Further, 200 g of the aqueous solution of polymer is mixed with 100 g of C. I. Pigment Blue 15:3 and 700 g of ion-exchanged water. After the mixture is mechanically stirred for a predetermined time, undispersed matter containing coarse particles is removed by centrifugation to yield a cyan dispersion liquid. The resulting cyan dispersion liquid has a pigment concentration of 10% by mass.

(2) Preparation of Ink

In the preparation of ink, the cyan dispersion liquid obtained above is used. The materials listed below are added to the cyan dispersion liquid to produce a predetermined concentration. After the materials are sufficiently stirred and mixed, the mixture is subjected to pressure filtration using a microfilter with a pore size of 2.5 μm (manufactured by FUJIFILM Corporation) to prepare pigment ink having a pigment concentration of 2% by mass.
Cyan dispersion liquid obtained above: 20 parts
Fluorinated surfactant: ZONYL® FSO-100 (manufactured by DuPont): 0.05 parts
Glycerin: 10 parts
Diethylene glycol: 10 parts
Acetylene glycol EO adduct (manufactured by Kawaken Fine Chemicals Co., Ltd.): 0.5 parts
Triethanolamine: 0.5 parts
Ion-exchanged water: remainder Preparation of Magenta Ink (1) Preparation of Dispersion Liquid First, an AB block polymer having an acid value of 300 and a number-average molecular weight of 2500 is produced with benzyl acrylate and methacrylic acid as raw materials by a conventional process. The AB block polymer is neutralized with an aqueous solution of potassium hydroxide and then diluted with ion-exchanged water to yield a 50% by mass homogeneous aqueous solution of polymer.

Further, 100 g of the aqueous solution of polymer is mixed with 100 g of C. I. Pigment Red 122 and 800 g of ion-exchanged water. After the mixture is mechanically stirred for a predetermined time, undispersed matter containing coarse particles is removed by centrifugation to yield a magenta dispersion liquid. The resulting magenta dispersion liquid has a pigment concentration of 10% by mass.

(2) Preparation of Ink

In the preparation of ink, the magenta dispersion liquid obtained above is used. The materials listed below are added to the magenta dispersion liquid to produce a predetermined concentration. After the materials are sufficiently stirred and mixed, the mixture is subjected to pressure filtration using a microfilter with a pore size of 2.5 μm (manufactured by FUJIFILM Corporation) to prepare pigment ink having a pigment concentration of 4% by mass.
Magenta dispersion liquid obtained above: 40 parts
Fluorinated surfactant: ZONYL® FSO-100 (manufactured by DuPont): 0.05 parts
Glycerin: 10 parts
Diethylene glycol: 10 parts
Acetylene glycol EO adduct (manufactured by Kawaken Fine Chemicals Co., Ltd.): 0.5 parts
Triethanolamine: 0.5 parts
Ion-exchanged water: remainder Preparation of Yellow Ink (1) Preparation of Dispersion Liquid First, the anionic polymer P-1 described above is neutralized with an aqueous solution of potassium hydroxide and then diluted with ion-exchanged water to yield a 10% by mass homogeneous aqueous solution of polymer.

Further, 300 g of the aqueous solution of polymer is mixed with 100 g of C. I. Pigment Yellow 74 and 600 g of ion-exchanged water. After the mixture is mechanically stirred for a predetermined time, undispersed matter containing coarse particles is removed by centrifugation to yield a yellow dispersion liquid. The resulting yellow dispersion liquid has a pigment concentration of 10% by mass.

(2) Preparation of Ink

The materials listed below are sufficiently stirred and mixed. After the mixture is dissolved and dispersed and then subjected to pressure filtration using a microfilter with a pore size of 1.0 μm (manufactured by FUJIFILM Corporation) to prepare pigment ink having a pigment concentration of 4% by mass.

Yellow dispersion liquid obtained above: 40 parts
Fluorinated surfactant: ZONYL® FSO-100 (manufactured by DuPont): 0.025 parts
Glycerin: 9 parts
Ethylene glycol: 10 parts
Acetylene glycol EO adduct (manufactured by Kawaken Fine Chemicals Co., Ltd.): 1 parts
Triethanolamine: 0.5 parts
Ion-exchanged water: remainder Preparation of Light Cyan Ink (1) Preparation of Dispersion Liquid A cyan dispersion liquid having a pigment concentration of 10% by mass is prepared using raw materials and production method similar to those for the cyan ink described above.

(2) Preparation of Ink

In the preparation of ink, the cyan dispersion liquid obtained above is used. The materials listed below are added to the cyan dispersion liquid to produce a predetermined concentration. After the materials are sufficiently stirred and mixed, the mixture is subjected to pressure filtration using a microfilter with a pore size of 2.5 μm (manufactured by FUJIFILM Corporation) to prepare pigment ink having a pigment concentration of 0.8% by mass.
Cyan dispersion liquid obtained above: 8 parts
Fluorinated surfactant: ZONYL® FSO-100 (manufactured by DuPont): 0.025 parts
Glycerin: 10 parts
Diethylene glycol: 10 parts
Acetylene glycol EO adduct (manufactured by Kawaken Fine Chemicals Co., Ltd.): 0.5 parts
Triethanolamine: 1.0 parts
Ion-exchanged water: remainder Preparation of Light Magenta Ink (1) Preparation of Dispersion Liquid A magenta dispersion liquid having a pigment concentration of 10% by mass is prepared using raw materials and production method similar to those for the magenta ink described above.

(2) Preparation of Ink

In the preparation of ink, the magenta dispersion liquid obtained above is used. The materials listed below are added to the magenta dispersion liquid to produce a predetermined concentration. After the materials are sufficiently stirred and mixed, the mixture is subjected to pressure filtration using a microfilter with a pore size of 2.5 μm (manufactured by FUJIFILM Corporation) to prepare pigment ink having a pigment concentration of 0.8% by mass.
Magenta dispersion liquid obtained above: 8 parts
Fluorinated surfactant: ZONYL® FSO-100 (manufactured by DuPont): 0.025 parts
Glycerin: 10 parts
Diethylene glycol: 10 parts
Acetylene glycol EO adduct (manufactured by Kawaken Fine Chemicals Co., Ltd.): 0.5 parts
Triethanolamine: 1.0 parts
Ion-exchanged water: remainder Preparation of Gray Ink (1) Preparation of Dispersion Liquid First, an anionic polymer P-1 [styrene/butyl acrylate/acrylic acid copolymer (polymerization ratio (weight ratio)=30/40/30), acid value: 202, weight-average molecular weight: 6500] is prepared, neutralized with an aqueous solution of potassium hydroxide, and then diluted with ion-exchanged water to yield a 10% by mass homogeneous aqueous solution of polymer.

Further, 900 g of the aqueous solution of polymer is mixed with 100 g of carbon black. After the mixture is mechanically stirred for a predetermined time, undispersed matter containing coarse particles is removed by centrifugation to yield a gray dispersion liquid. The resulting gray dispersion liquid has a pigment concentration of 10% by mass.

(2) Preparation of Ink

In the preparation of ink, the gray dispersion liquid obtained above is used. The materials listed below are added to the gray dispersion liquid to produce a predetermined concentration. After the materials are sufficiently stirred and mixed, the mixture is subjected to pressure filtration using a microfilter with a pore size of 2.5 μm (manufactured by FUJIFILM Corporation) to prepare pigment ink having a pigment concentration of 0.3% by mass.

Gray dispersion liquid obtained above: 3 parts
Fluorinated surfactant: ZONYL® FSO-100 (manufactured by DuPont): 0.05 parts
Glycerin: 10 parts
Triethylene glycol: 10 parts
Acetylene glycol EO adduct (manufactured by Kawaken Fine Chemicals Co., Ltd.): 0.5 parts
Triethanolamine: 0.5 parts
Ion-exchanged water: remainder The recording medium used in this embodiment will now be described.

The advantages of this embodiment described below are more pronounced when glossy paper having a substrate and an ink receiving layer is used as a recording medium. In this embodiment, accordingly, premium luster paper 2 (thick exit) LFM-GPP2/24/280 (manufactured by CANON KABUSHIKI KAISHA), which is a type of glossy paper described above, is used as the recording medium 3.

In this embodiment, an image is recorded using a multi-pass recording method. In the multi-pass recording method, an image is recorded in a unit area on a recording medium during a plurality of scans. During each of the plurality of scans, ink is ejected in accordance with recording data that specifies ejection or non-ejection of ink to each of a plurality of pixel areas each having a plurality of pixels.

In this embodiment, a dither pattern and a mask pattern are used to generate recording data corresponding to each of the plurality of scans from image data. A general method for processing image data using a dither pattern and a mask pattern will be described in detail hereinbelow. In the following description, for simplicity, image data that is 8-bit data capable of representing a gradation value of 256 levels of gradation, i.e., from 0 to 255, is used. It is also assumed here that both the dither pattern and the mask pattern have a size corresponding to an area of 8 pixels×8 pixels, which corresponds to a unit area.

Figure 1:
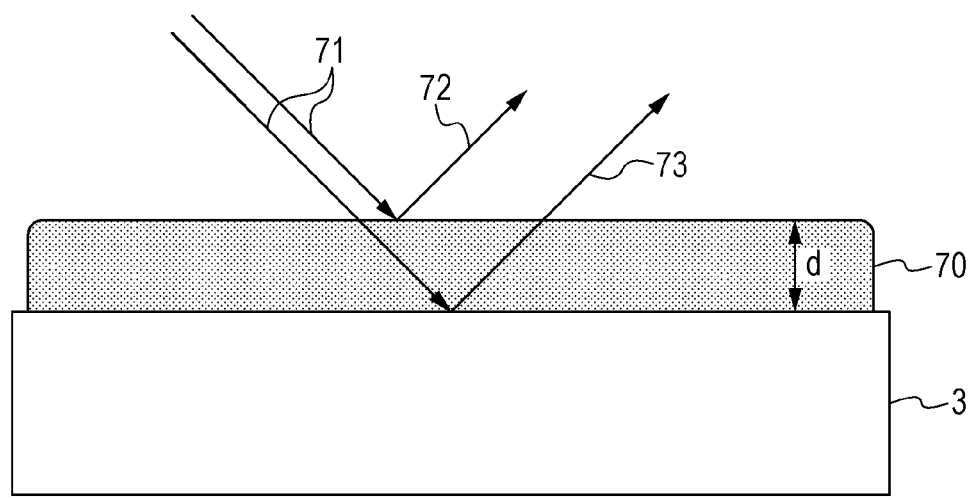
FIG. 1 is a diagram depicting thin-film interference on an ink layer.

FIGS. 6A, 6B, 6C1 to 6C4, and 6D1 to 6D4 are diagrams depicting a method for processing the image data described above. FIG. 6A is a diagram schematically illustrating an example of the dither pattern. FIG. 6B is a schematic diagram illustrating binary data generated by the application of the dither pattern illustrated in FIG. 6A to image data having a gradation value (information concerning a gradation value) of 64. FIGS. 6C1 to 6C4 are schematic diagrams illustrating an example of mask patterns corresponding to the first to fourth scans, respectively. FIGS. 6D1 to 6D4 are schematic diagrams illustrating pieces of recording data corresponding to the first to fourth scans, respectively, which are generated by the application of the mask patterns illustrated in FIGS. 6C1 to 6C4 to the binary data illustrated in FIG. 6B, respectively.

In the dither pattern, as illustrated in FIG. 6A, a different threshold value is defined for each of a plurality of pixels. If a gradation value of multi-valued data for each pixel is larger than the corresponding threshold value, the multi-valued data is converted into 1-bit data (hereinafter also referred to as "binary data") indicating ejection of ink for the corresponding pixel. If a gradation value of multi-valued data for each pixel is less than or equal to the corresponding threshold value, the multi-valued data is converted into binary data indicating non-ejection of ink for the corresponding pixel. In the following description, multi-valued data having the same value is input to all the pixel areas within a unit area. Alternatively, multi-valued data having a different value may be input to each pixel area.

For example, in a case where a gradation value of the multi-valued data for the preceding pixel is 64, a threshold value of 9 (<64) is set for a pixel 90 in the dither pattern illustrated in FIG. 6A, and thus the multi-valued data corresponding to the pixel 90 is converted into binary data indicating ejection of ink. Further, a threshold value of 143 (≥64) is set for a pixel 91, and thus the multi-valued data corresponding to the pixel 91 is converted into binary data indicating non-ejection of ink. In the way described above, with the use of the dither pattern illustrated in FIG. 6A, the binary data illustrated in FIG. 6B is generated from multi-valued data indicating a gradation value of 64.

As illustrated in FIGS. 6C1 to 6C4, furthermore, each mask pattern has recording-permitting pixels and non-recording-permitting pixels. The recording-permitting pixels are pixels for which ejection of ink is permitted, and the non-recording-permitting pixels are pixels for which ejection of ink is not permitted. In FIGS. 6C1 to 6C4, solid black portions represent the recording-permitting pixels, and solid white portions represent the non-recording-permitting pixels.

Here, recording data corresponding to each scan is generated by a logical AND of input binary data and the mask pattern corresponding to the associated scan. That is, for the recording-permitting pixels, when binary data indicating ejection of ink is input, the binary data is converted into recording data indicating ejection of ink. For the non-recording-permitting pixels, on the other hand, even though binary data indicating ejection of ink is input, the binary data is converted into recording data indicating non-ejection of ink. In the respective mask patterns illustrated in FIGS. 6C1 to 6C4, the recording-permitting pixels are arranged so that the recording-permitting pixels in each of the mask patterns are located at different positions from the positions of the corresponding recording-permitting pixels in the other mask patterns and so that the logical OR equals all the pixels.

Specifically, applying the mask pattern illustrated in FIG. 6C1 corresponding to the first scan to the binary data illustrated in FIG. 6B allows the binary data to be distributed, and the recording data illustrated in FIG. 6D1 corresponding to the first scan is generated. In a similar manner, the binary data illustrated in FIG. 6B is distributed into the second to fourth scans, and the pieces of recording data illustrated in FIGS. 6D2 to 6D4 corresponding to the second to fourth scans are generated.

During each of the first to fourth scans, ink is ejected in accordance with the pieces of recording data illustrated in FIGS. 6D1 to 6D4, which are generated in the way described above, respectively, to record an image.

The multi-pass recording method described above will be described in detail hereinbelow. In the following description, image data having a gradation value of 64 is input. As described above, in a case where image data having a gradation value of 64 is input, the pieces of recording data illustrated in FIGS. 6D1 to 6D4 are generated, and thus ink is ejected in accordance with the generated pieces of recording data. When converted into recording duty, the image data having a gradation value of 64 corresponds to a duty of 25% (=64/256×100).

Figure 7:
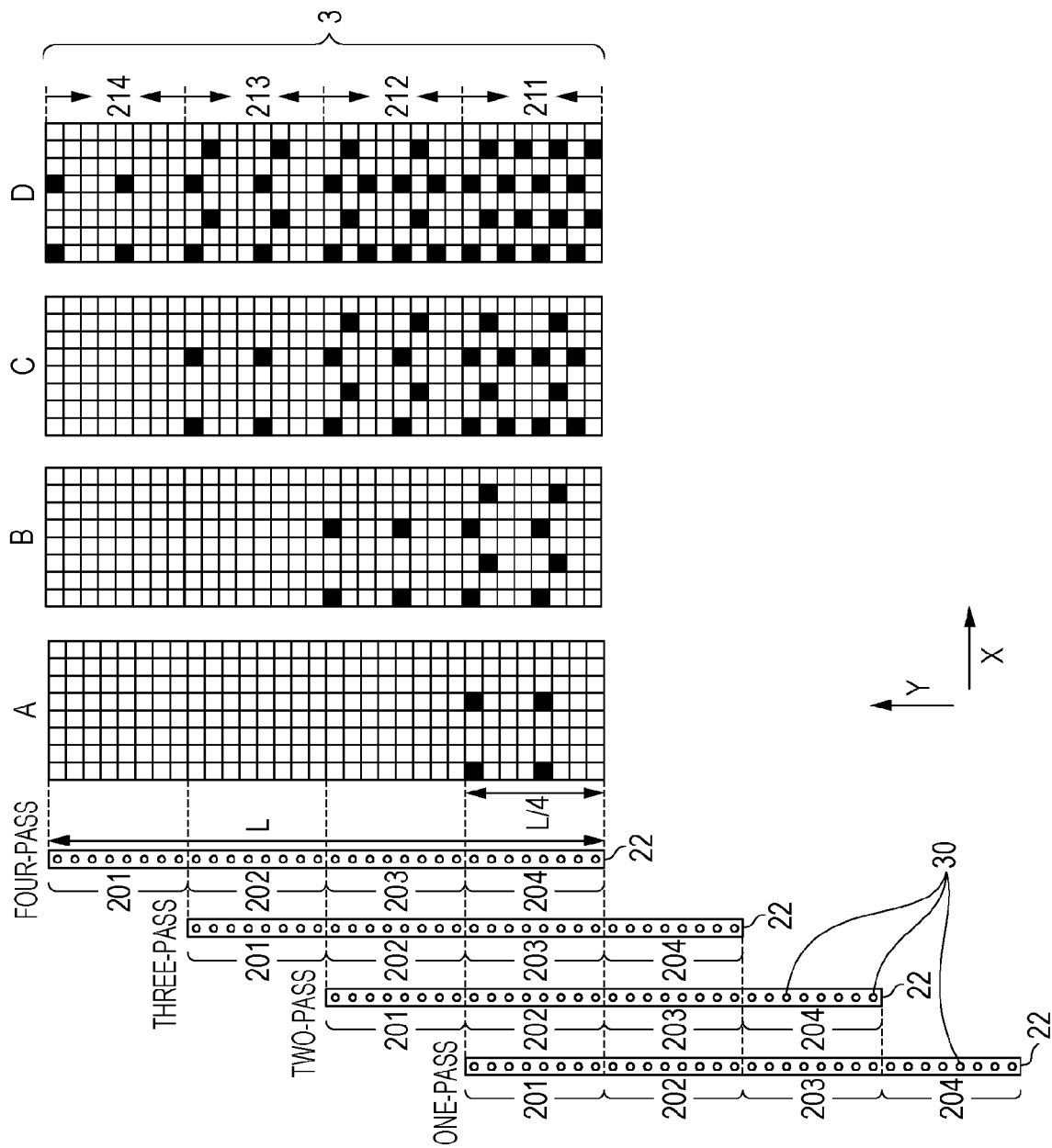
FIG. 7 is a diagram depicting a multi-pass recording method.

FIG. 7 is a diagram illustrating a general multi-pass recording method used for recording in a unit area on a recording medium by performing a scanning and recording operation four times. In the following description, a recording head having a single ejection port array is used as the recording head 7, for simplicity.

An ejection port array 22 for ejecting ink has ejection ports 30, and the ejection ports 30 are divided into four recording groups 201, 202, 203, and 204 in a sub-scanning direction.

During the first scan, ink is ejected from the recording group 201 to an area 211 on the recording medium 3 in accordance with the recording data illustrated in FIG. 6D1. As a result, ink droplets are ejected to positions on the recording medium 3 which are indicated by black dots in part (A) of FIG. 7.

Then, the recording medium 3 is relatively conveyed from upstream to downstream of the recording head 7 in the Y direction by a distance of L/4.

After that, the second scanning and recording operation is performed. In the second scanning and recording operation, ink is ejected from the recording group 202 to the area 211 on the recording medium 3 in accordance with the recording data illustrated in FIG. 6D2, and ink is further ejected from the recording group 201 to an area 212 on the recording medium 3 in accordance with the recording data illustrated in FIG. 6D1. As a result of the second scanning and recording operation, an image indicated by black dots in part (B) of FIG. 7 is formed on the recording medium 3.

Subsequently, the scanning of the recording head 7 and the relative conveyance of the recording medium 3 are alternately repeated. Consequently, after the fourth scanning and recording operation is completed, in part (D) of FIG. 7, ink has been ejected to a pixel area that occupies 25% of the recordable pixel area within the area 211 on the recording medium 3, and an image with a duty of 25% is formed.

Figure 8:
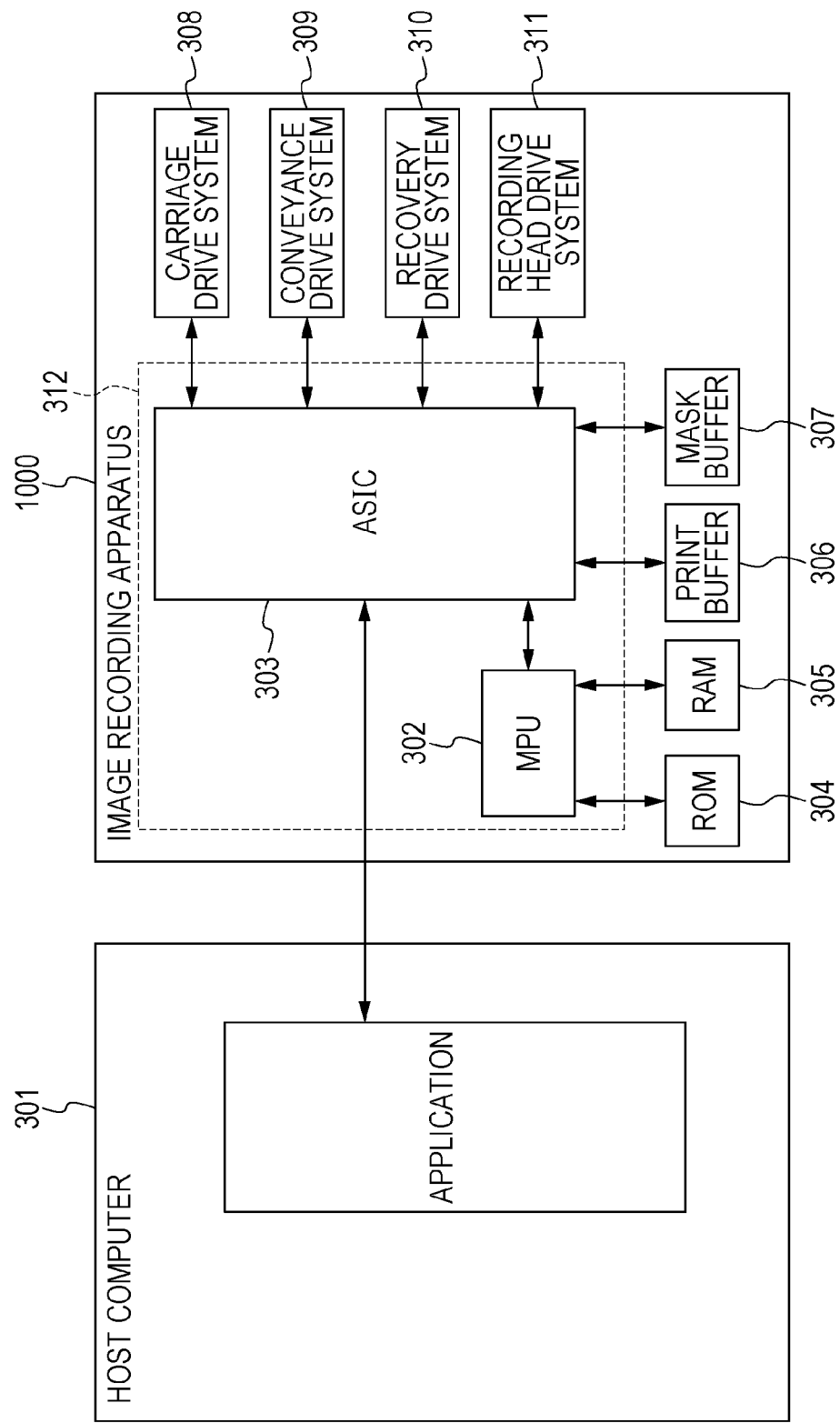
FIG. 8 is a block diagram illustrating a configuration of a recording control system according to the first embodiment.

FIG. 8 is a block diagram illustrating a schematic configuration of a recording control system according to this embodiment.

A host computer 301 serving as an image input unit transmits multi-valued image data in red-green-blue (RGB) form, which is saved in various storage media such as a hard disk, to an image processing unit 312 in the image recording apparatus 1000. As used herein, the term "unit" generally refers to any combination of software, firmware, hardware, or other component, such as circuitry, that is used to effectuate a purpose.

The image processing unit 312 includes, for example, a microprocessor unit (MPU) 302 and an application specific integrated circuit (ASIC) 303 described below. The image processing unit 312 may also receive multi-valued image data from an external image input device connected to the host computer 301, such as a scanner or a digital camera. The image processing unit 312 performs image processing, such as dithering and masking described below, on the input multi-valued image data to convert the input multi-valued image data into binary image data. Accordingly, binary image data serving as recording data for allowing a plurality of types of ink to be ejected from the recording head 7 during each of a plurality of scans is generated.

The image recording apparatus 1000, which serves as an image output unit, applies ink to the recording medium 3 in accordance with the binary image data for the ink, which is generated by the image processing unit 312, to record an image. The image recording apparatus 1000 is controlled by the MPU 302 in accordance with a program recorded on a read-only memory (ROM) 304. The ROM 304 also stores the dither patterns and mask patterns described above. A random access memory (RAM) 305 functions as a work area of the MPU 302 or as a temporary data storage area. The MPU 302 controls a drive system 308 for the carriage 6, a conveyance drive system 309 for the recording medium 3, a recovery drive system 310 for the recording head 7, and a drive system 311 for the recording head 7 through the ASIC 303.

A print buffer 306 temporarily stores recording data that has been converted into a data format which can be transferred to the recording head 7.

A mask buffer 307 temporarily stores a mask pattern that is applied when recording data is transferred to the recording head 7. Mask patterns are prepared in the ROM 304, and a desired mask pattern for actual recording is read from the ROM 304 and is stored in the mask buffer 307.

In this embodiment, the image recording apparatus 1000 includes an image processing unit, by way example. Alternatively, the host computer 301 may include an image processing unit.

In this embodiment, in a recording apparatus that uses ink having a relatively low dot height and ink having a relatively high dot height, the degree of adjacency between dots formed by the ink having a low dot height when ink having a high dot height is ejected a relatively large amount is set higher than the degree of adjacency between dots formed by the ink having a low dot height when ink having a high dot height is ejected a relatively small amount. Controlling the degree of adjacency between dots in the manner described above provides recording with a reduced change in the color tint of an image.

First, the dot height of ink used in this embodiment will be described in detail hereinafter.

One drop (4.5 pl) of each type of ink used in this embodiment was applied to a recording medium, and the height of a dot formed thereby was measured with an atomic force microscope. Table 1 shows results of measurement of dot heights which were measured for individual types of ink. For evaluation of the heights of dots which have been fixed to the recording medium, the dot heights shown in Table 1 are those measured several minutes after the respective types of ink were ejected.

TABLE 1

| Ink | Dot height (mm) |
|---|---|
| Cyan (C) | 125 |
| Magenta (M) | 195 |
| Yellow (Y) | 230 |
| Black (K) | 145 |
| Light cyan (Lc) | 110 |
| Light magenta (Lm) | 50 |
| Gray (G) | 20 |

As can be seen from Table 1, the dot heights of the gray ink and the light magenta ink are relatively lower than the dot heights of the other colors of ink. The reason for this is considered to be due to the gray ink and the light magenta ink having a lower pigment concentration than the other colors of ink, so that the amount of pigment remaining on the recording medium after the recording of an image is completed is small.

The dot height of the light cyan ink is higher than that of the gray ink and the light magenta ink although the pigment concentration of the light cyan ink is substantially equal to that of the light magenta ink. The reason for this is considered to be due to the size and unevenness of pigment particles contained in the light cyan ink being larger than the size and unevenness of pigment particles contained in the light magenta ink.

Next, the degree of adjacency between dots will be described in detail hereinafter.

In this embodiment, the degree of adjacency between dots (hereinafter referred to as "dot adjacency") is evaluated using the number of dots formed at adjacent positions on a recording medium. In this embodiment, dots formed at adjacent positions on a recording medium during the same scan and dots formed at adjacent positions on a recording medium during different scans are both evaluated as "adjacent dots".

Figure 9A:
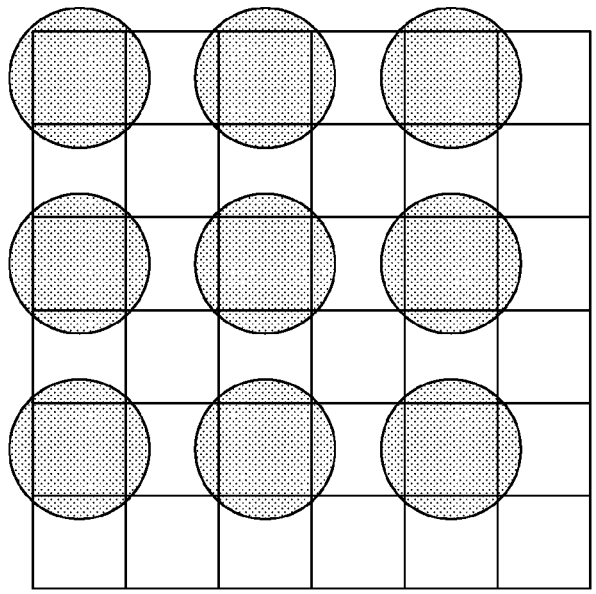
FIGS. 9A and 9B are schematic diagrams depicting the definition of dot adjacency.
Figure 9B:
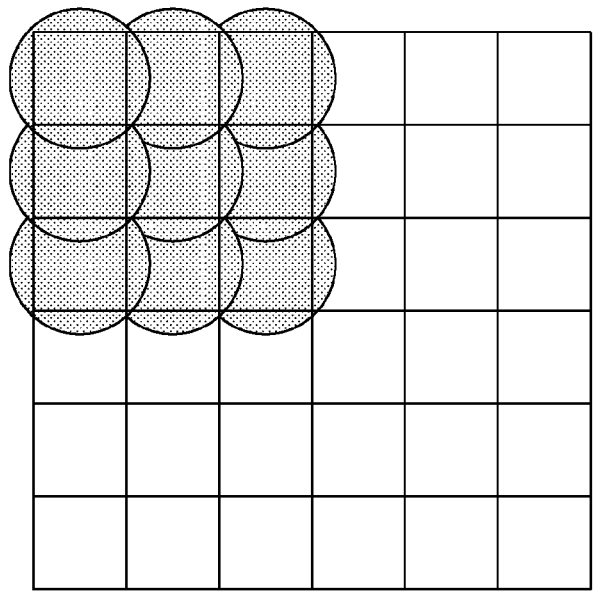

FIGS. 9A and 9B are diagrams depicting dot adjacency in this embodiment.

In this embodiment, dot adjacency can be evaluated as a value obtained by measuring the numbers of dots formed in adjacent pixel areas among a plurality of dots ejected in an area, and calculating an average of the numbers of dots within the area.

For example, in FIG. 9A, nine dots are formed in separate pixel areas. Thus, there are no adjacent dots in an area formed of a 6×6 pixel area. Thus, every dot within the area has no dot adjacent thereto, i.e., the number of adjacent dots is one. Accordingly, the dot adjacency, which is given by an average of the numbers of adjacent dots within the area, is evaluated to be 1.

Further, in FIG. 9B, nine dots are formed in adjacent pixel areas. Thus, the number of adjacent dots is evaluated to be 9. Since there is no dot other than the nine dots within the area formed of the 6×6 pixel area. Accordingly, the dot adjacency, which is given by an average of the numbers of adjacent dots within the area, is evaluated to be 9.

An estimation mechanism for controlling the dot adjacency in the manner described above to suppress a change in color tint will be described in detail hereinafter.

Figure 10A:
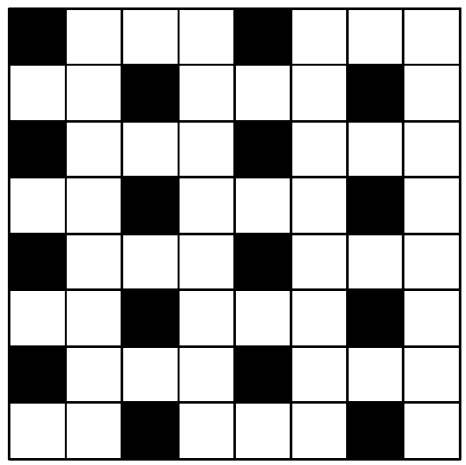
FIGS. 10A to 10D are diagrams depicting an ink layer formed for low dot adjacency.
Figure 10B:
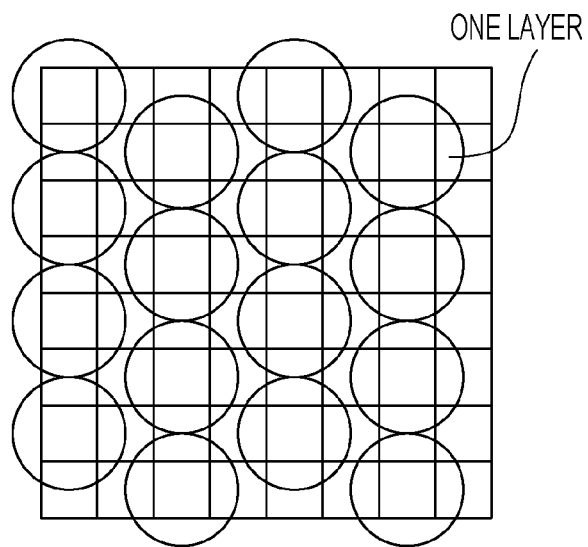
Figure 10C:
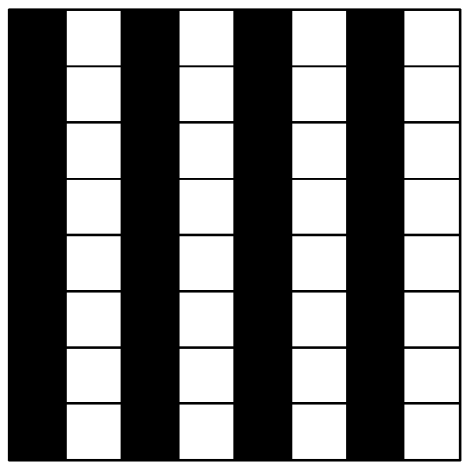
Figure 10D:
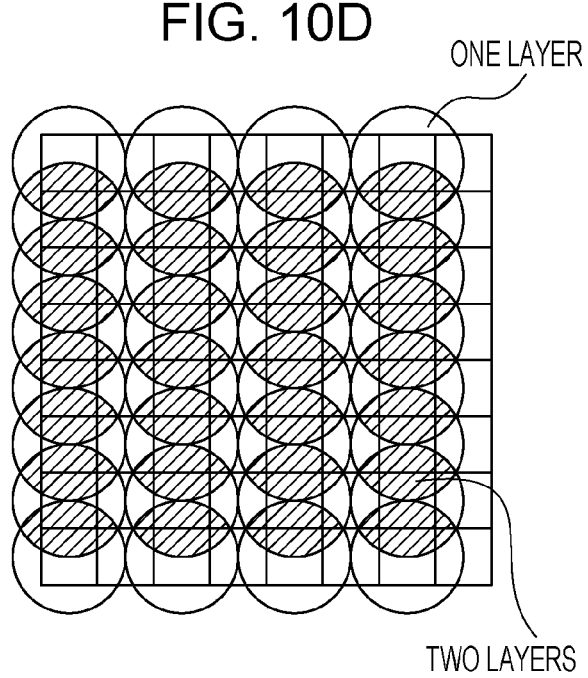

FIGS. 10A to 10D are schematic diagrams depicting recording with a relatively low dot adjacency for ink having a low dot height. FIGS. 10A and 10C are diagrams illustrating binary data generated for image data having a gradation value of 64 (a recording duty of 25%) and image data having a gradation value of 128 (a recording duty of 50%), respectively, using the dither pattern illustrated in FIG. 6A so that the dot adjacency is relatively reduced. FIGS. 10B and 10D are schematic diagrams illustrating images formed on a recording medium when ink is ejected in accordance with the binary data illustrated in FIG. 10A and the binary data illustrated in FIG. 10C, respectively.

As described above, when image data having a gradation value of 64 (a recording duty of 25%) is quantized using the dither pattern illustrated in FIG. 6A, the binary data illustrated in FIG. 6B and FIG. 10A is generated. When ink is ejected during a plurality of scans in accordance with the illustrated binary data, dots are formed so that the dot adjacency is 1, as schematically illustrated in FIG. 10B. In this case, none of the dots overlaps, resulting in the ink layer on the recording medium being formed of a single layer. If ink having a low dot height is used, an ink layer has a small and uniform thickness across the entire area. Thus, thin-film interference occurs in substantially the same form in every area on the ink layer, resulting in the change in color tint being noticeable.

When image data having a gradation value of 128 is quantized using the dither pattern illustrated in FIG. 6A, the binary data illustrated in FIG. 10C is generated. When ink is ejected in accordance with the illustrated binary data, dots are formed in a manner schematically illustrated in FIG. 10D. In this case, the dot adjacency is 8. As can be understood from FIG. 10D, in the case of a gradation value of 128 (a recording duty of 50%), the ink layer has an area formed by one layer and an area formed by two layers. The area formed by two layers has a larger layer thickness than the area formed by one layer, and therefore has a larger optical path difference. That is, the optical path difference is less uniform than that in the case of a recording duty of 25%, and is larger on average. Thus, the effect of the thin-film interference slightly decreases although the change in color tint is not sufficiently suppressed.

Figure 11A:
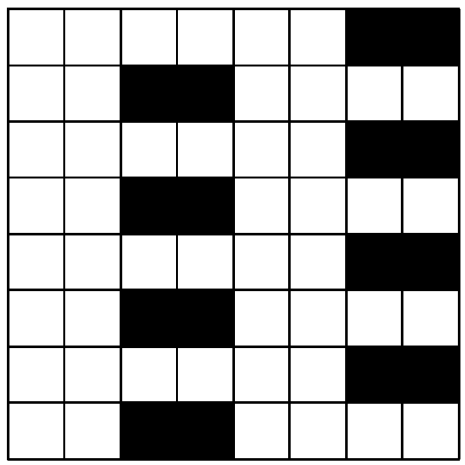
FIGS. 11A to 11D are diagrams depicting an ink layer formed for high dot adjacency.
Figure 11B:
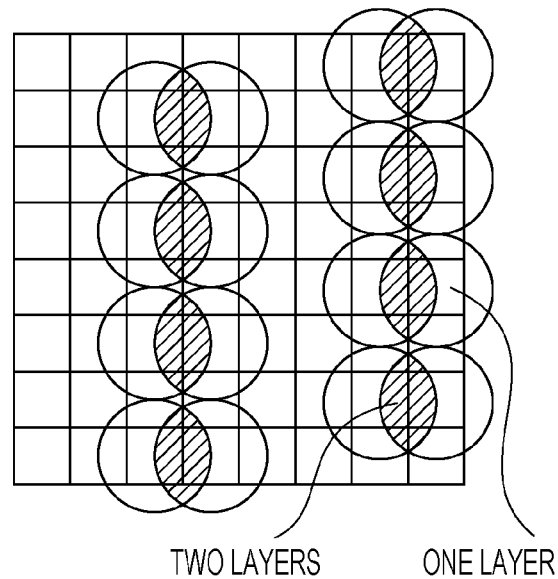
Figure 11C:
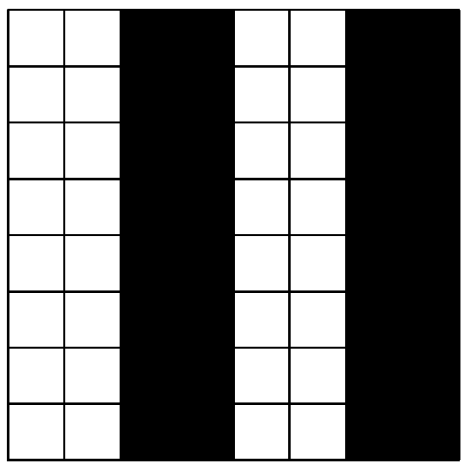
Figure 11D:
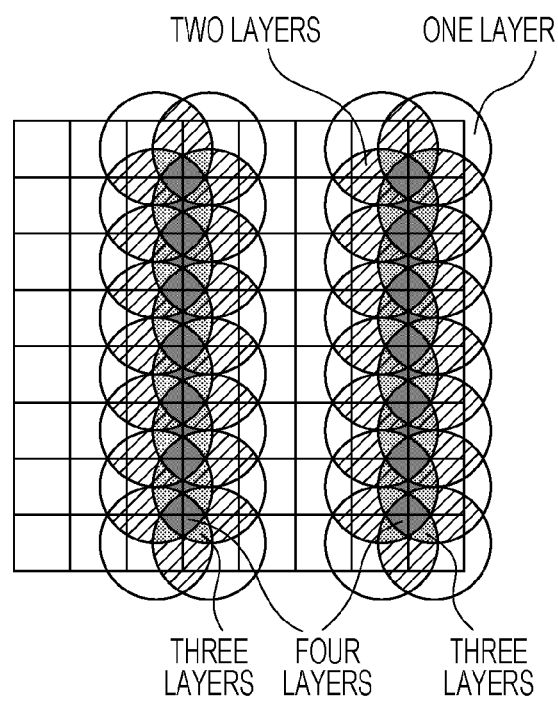

FIGS. 11A and 11B are schematic diagrams depicting recording with a relatively high dot adjacency for ink having a low dot height. FIGS. 11A and 11C are diagrams illustrating binary data generated for image data having a gradation value of 64 (a recording duty of 25%) and image data having a gradation value of 128 (a recording duty of 50%), respectively, so that the dot adjacency will be relatively increased. FIGS. 11B and 11D are schematic diagrams illustrating images formed on a recording medium when ink is ejected in accordance with the binary data illustrated in FIG. 11A and the binary data illustrated in FIG. 11C, respectively.

When ink is ejected during a plurality of scans in accordance with the binary data illustrated in FIG. 11A, as schematically illustrated in FIG. 11B, dots are formed so that a plurality of dots overlap even though the recording duty is as low as 25%. In this case, the dot adjacency is 2, which is higher than the dot adjacency in the case schematically illustrated in FIG. 10B. As schematically illustrated in FIG. 11B, the ink layer has an area formed by one layer and an area formed by two layers. Thus, the effect of thin-film interference may be suppressed, compared to the case where an ink layer is formed in the manner schematically illustrated in FIG. 10B.

Even in the case of a recording duty as high as 50%, ink is ejected during a plurality of scans in accordance with the binary data illustrated in FIG. 11C. Thus, as schematically illustrated in FIG. 11D, a larger number of ink layers are formed so as to overlap one another. In FIG. 11D, the dot adjacency is 16, which is higher than the dot adjacency in the case illustrated in FIG. 10D. In this case, the ink layer has an area formed by three layers and an area formed by four layers in addition to the area formed by one layer or two layers. Accordingly, the ink layer has a large and non-uniform thickness, achieving recording with the effect of thin-film interference reduced and the change in color tint suppressed.

Figure 12A:
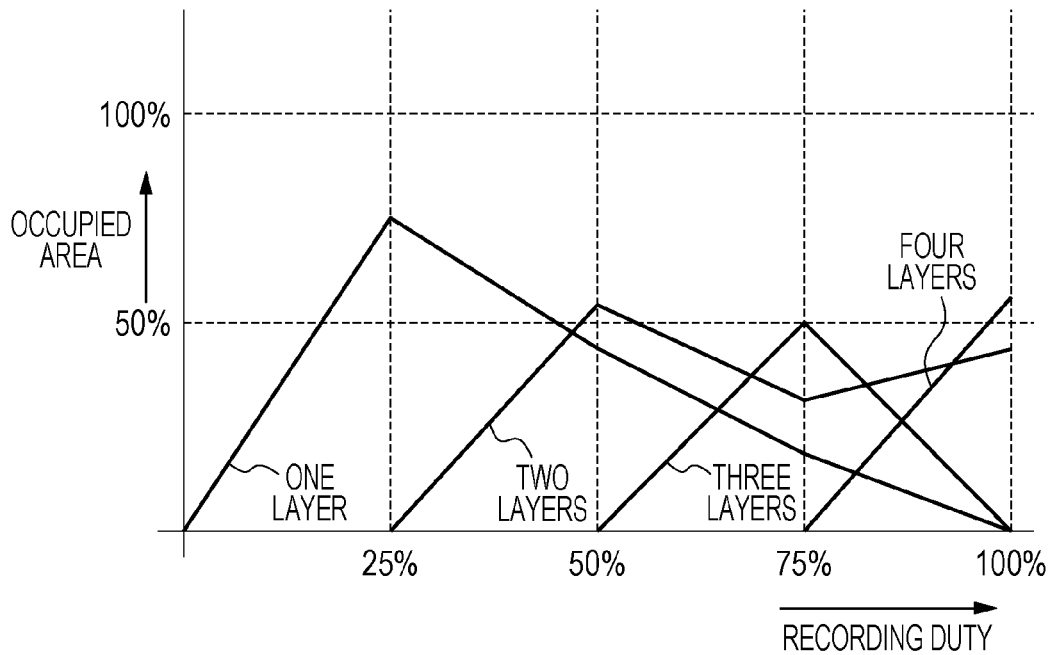
FIGS. 12A and 12B are diagrams depicting a correlation between recording duty and the area occupied by the ink layer.
Figure 12B:
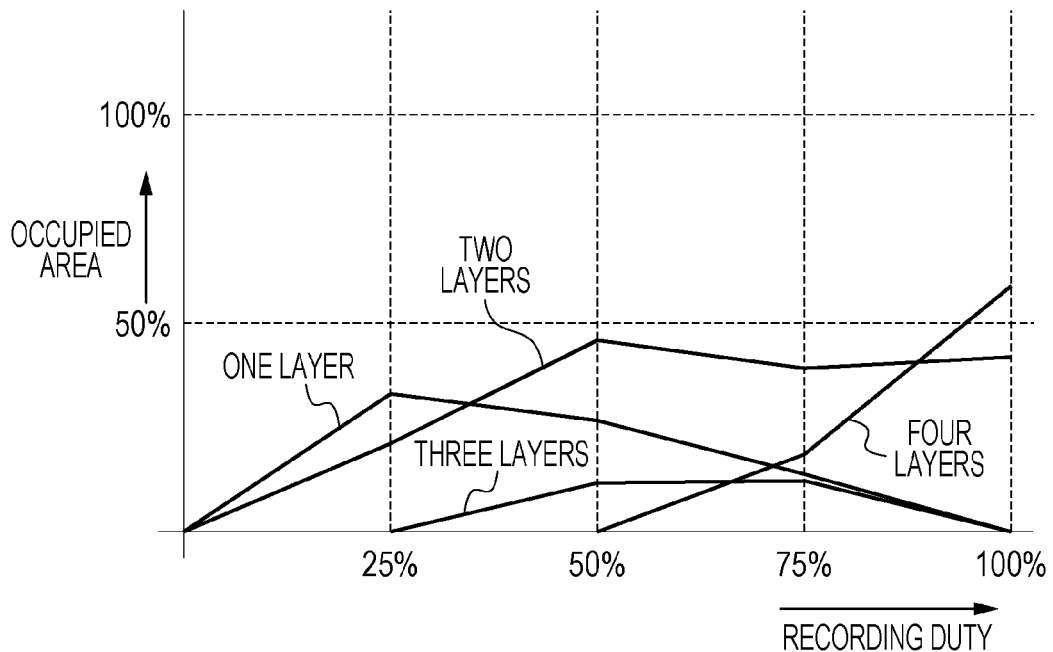

FIGS. 12A and 12B are diagrams depicting recording duty and the area that is occupied by an ink layer within the entire area of the recording medium when dot adjacency is controlled. In FIGS. 12A and 12B, gray ink among the above-described colors of ink used in this embodiment is used. FIG. 12A illustrates an image recorded with a relatively low dot adjacency. FIG. 12B illustrates an image recorded with a relatively high dot adjacency.

First, a description will be given of an ink layer formed for recording with a low dot adjacency as illustrated in FIG. 12A. In a case where the recording duty is 0 to 25%, the ink layer is formed of one layer. When the recording duty is 25 to 50%, the size of the area formed by one layer starts to decrease, whereas the size of the area formed by two layers increases. When the recording duty is 50 to 75%, the area formed by three layers appears. When the recording duty is 75 to 100%, the area formed by four layers appears.

Then, a description will be given of an ink layer formed for recording with a high dot adjacency as illustrated in FIG. 12B. In this case, the area formed by one layer and the area formed by two layers are concurrently present when the recording duty is 0 to 25%. When the recording duty is 25 to 50%, the area formed by three layers further appears. When the recording duty is 50 to 75%, the area formed by four layers further appears.

In the manner described above, it can be experimentally shown that an increase in dot adjacency can increase the layer thickness of an ink layer and make the ink layer non-uniform even when the recording duty is low.

Figure 13:
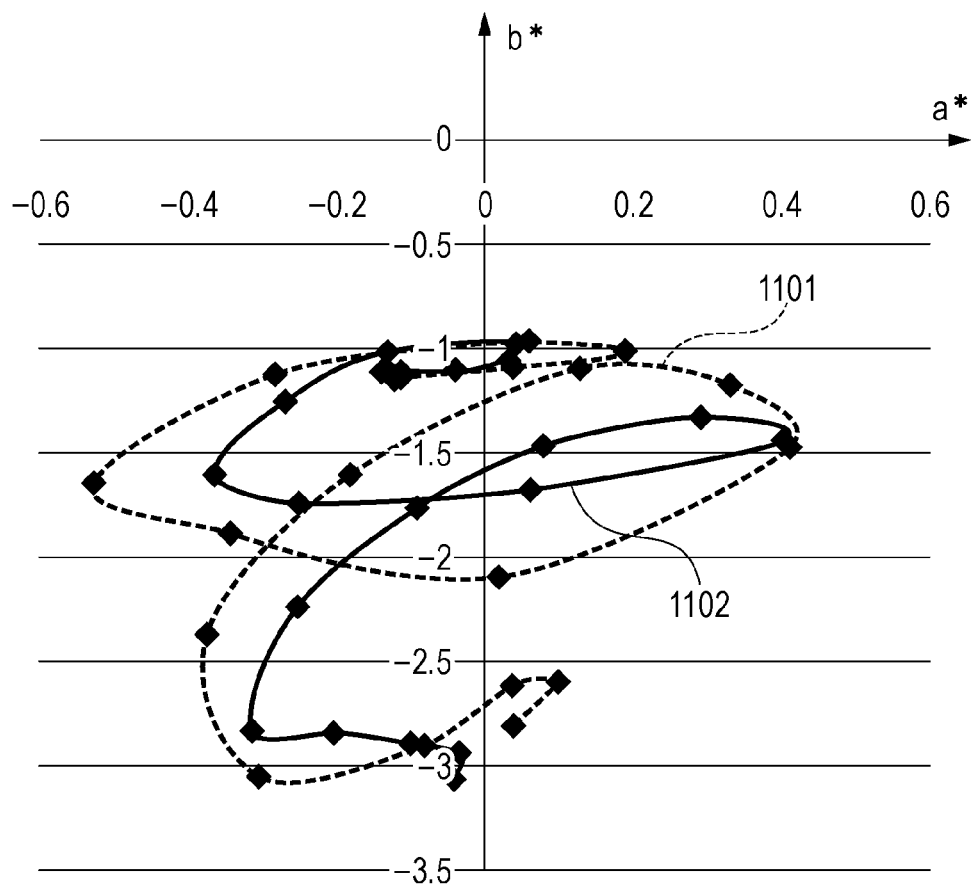
FIG. 13 is a diagram depicting a change in color tint when dot adjacency is controlled.

FIG. 13 is a diagram depicting a change in the color tint of an image when dot degree adjacency is controlled.

In FIG. 13, a broken line 1101 indicates how the a* and b* values change in the a*b* plane of images recorded by the ejection of the Gy ink with a relatively low dot adjacency, as illustrated in FIGS. 10A and 10B, and while the recording duty is changed at several levels in the range of 0% to 100%. In FIG. 13, a solid line 1102 indicates how the a* and b* values change in the a*b* plane of images recorded by the ejection of the Gy ink with a relatively high dot adjacency, as illustrated in FIGS. 11A and 11B, and while the recording duty is changed at several levels in the range of 0% to 100%.

As can be understood from FIG. 13, the solid line 1102 corresponding to the image recorded with a high dot adjacency exhibits a small change particularly in the b* value. It is also observed that the solid line 1102 exhibits a relatively smaller change in the a* value than the broken line 1101 does.

Referring to FIGS. 12A and 12B and FIG. 13, it can be experimentally observed that recording with a high dot adjacency for ink having a low dot height enables the production of a non-uniform ink layer having a large thickness, resulting in the effect of thin-film interference being reduced and the change in the color tint of an image being suppressed.

On the other hand, recording with a high dot adjacency may cause a plurality of ink drops to be formed so as to be concentrated in areas that are close to each other on a recording medium, resulting in the graininess of the entire image being noticeable. An image generated by the ejection of ink in accordance with the binary data illustrated in FIG. 10A, and an image recorded by the ejection of ink in accordance with the binary data illustrated in FIG. 11A were created for each type of ink used in this embodiment. Then, the graininess of the images was evaluated. The evaluation of graininess was based on a graininess algorithm conforming to ISO 13660. A larger graininess value can be determined to be associated with lower granularity. While graininess measurement can be made using a variety of measurement devices, in this embodiment, graininess measurement was performed using Image Scanner ES-2200 (manufactured by Seiko Epson Corporation). Graininess evaluation index values are shown in Table 2.

TABLE 2

| Graininess value | Judgment based on visual inspection | Evaluation |
|---|---|---|
| Less than 0.05 | Substantially no graininess is observed | Excellent |
| 0.05 or greater and less than 0.055 | Some graininess is observed with considerable inspection | Good |
| 0.55 or greater | Graininess is observed but is not serious | Normal |

Here, an image recorded with a high dot adjacency for ink and an image recorded with a low dot adjacency for ink were prepared for each type of ink, and the change in color tint and the graininess of the respective images were measured in accordance with the evaluation method described above. The measurement results are shown in Table 3. Evaluation criteria for the change in color tint are as follows: An image with substantially no change in color tint was rated as "good", and an image with some changes in color tint was rated as "normal".

TABLE 3

| Ink | Dot adjacency | Change in color tint | Graininess |
|---|---|---|---|
| Cyan (C) | Low | Good | Excellent |
| | High | Good | Normal |
| Magenta (M) | Low | Good | Excellent |
| | High | Good | Normal |
| Yellow (Y) | Low | Good | Excellent |
| | High | Good | Normal |
| Black (K) | Low | Good | Excellent |
| | High | Good | Normal |
| Light cyan (Lc) | Low | Good | Excellent |
| | High | Good | Good |
| Light Magenta (Lm) | Low | Normal | Excellent |
| | High | Good | Excellent |
| Gray (G) | Low | Normal | Excellent |
| | High | Good | Excellent |

Referring to Table 3, it is experimentally observed that the change in color tint is noticeable for recording with a low dot adjacency for the gray ink or the light magenta ink having a low dot height. It is also observed that recording with a high dot adjacency for the gray ink or the light magenta ink can reduce the effect of the change in color tint and can suppress the occurrence of thin-film interference.

Figure 2A:
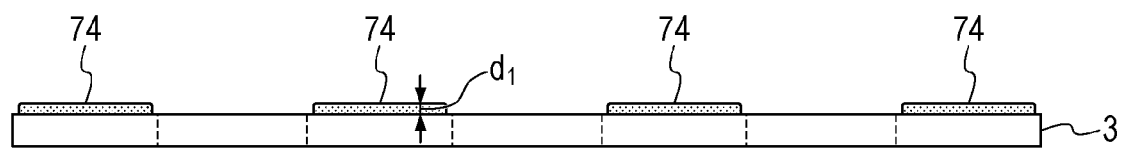
FIGS. 2A to 2C are diagrams depicting a correlation between a dot height and the degree of thin-film interference.
Figure 2B:
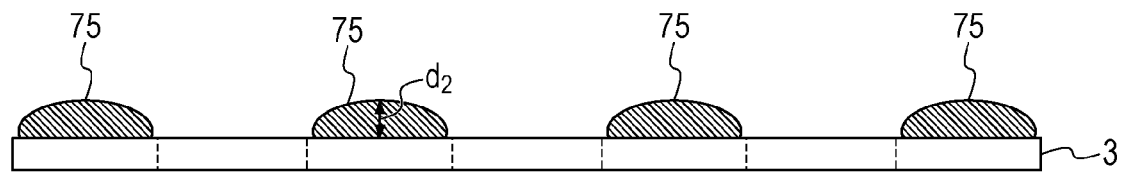
Figure 2C:
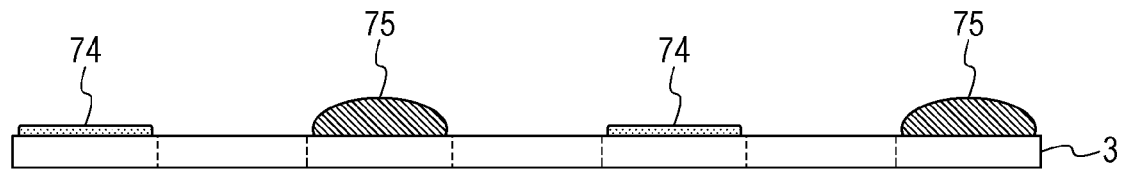

As illustrated in FIGS. 2A to 2C, even recording with a low dot adjacency for the gray ink or the light magenta ink having a low dot height would also reduce the effect of the change in color tint if recording with the other colors of ink is performed on the same area to some extent. This point will be described in detail hereinbelow.

Figure 14:
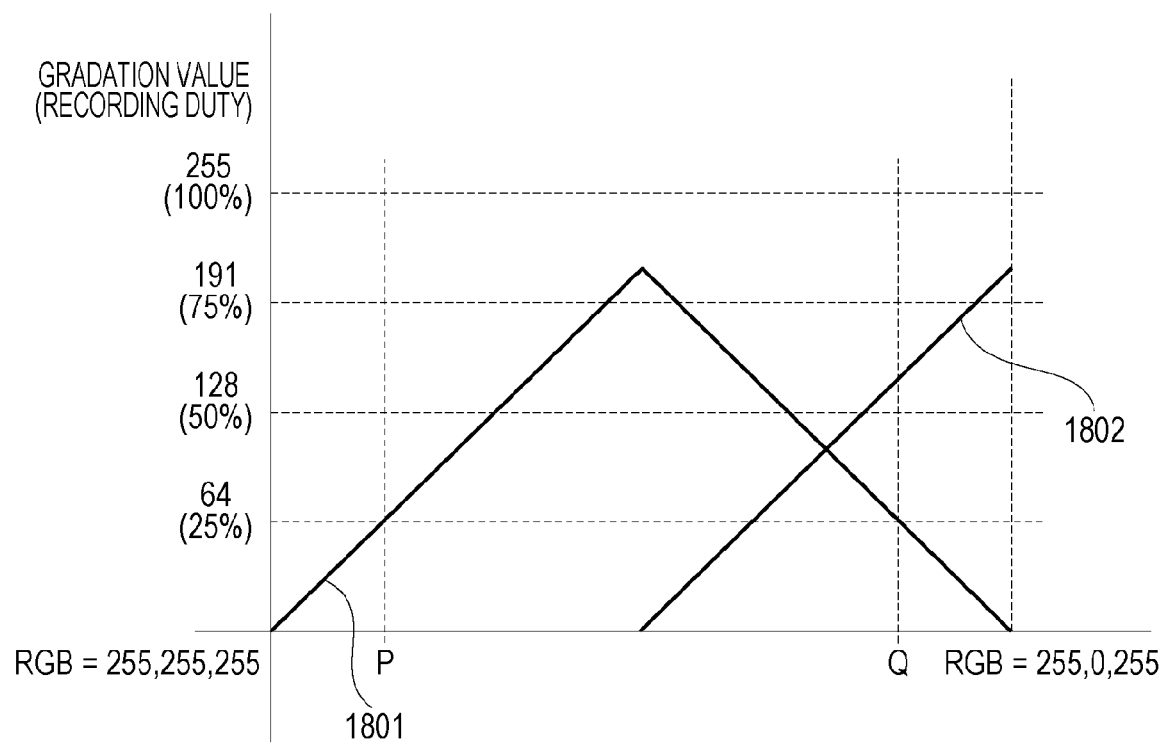
FIG. 14 is a diagram illustrating the amount of ejected magenta ink and the amount of ejected light magenta ink at individual levels of gradation.

FIG. 14 is a diagram illustrating so-called magenta lines to explain a color separation process for an RGB signal to a CMYKLcLmGy signal when a plurality of pieces of image data each having a G value that is different in the range from white (RGB value=255, 255, 255) to magenta (RGB value=255, 0, 255) are input as image data. In FIG. 14, the horizontal axis corresponds to a decrease in G value, and the vertical axis corresponds to the gradation values (recording duties) of each type of ink. A line 1801 indicates the gradation value of the light magenta ink, and a line 1802 indicates the gradation value of the magenta ink.

As can be understood from FIG. 14, the gradation values of the magenta ink and the light magenta ink, which have the same hue but have different densities, change in different ways as the G value changes. Specifically, in the magenta lines, when the G value is high, the gradation value of the light magenta ink increases as the G value decreases. When the G value is low, on the other hand, as the G value decreases, the gradation value of the light magenta ink decreases and the gradation value of the magenta ink increases.

Thus, multi-valued data in the magenta lines includes two pieces of multi-valued data, that is, multi-valued data in which the gradation value of the magenta ink is high and multi-valued data in which the gradation value of the magenta ink is low, even when the gradation value of the light magenta ink is the same. For example, in the magenta lines, when the G value is at a point P, color separation is performed so as to generate multi-valued data in which a gradation value of 64 (a recording duty of 25%) is set for the light magenta ink. In the magenta lines, when the G value is at a point Q, color separation is performed so as to generate multi-valued data in which a gradation value of 64 (a recording duty of 25%) is set for the light magenta ink and a gradation value of 140 (recording duty of 55%) is set for the magenta ink.

An image recorded with a high dot adjacency and an image recorded with a low dot adjacency were created for each of the multi-valued data generated when the G value in the magenta lines is at the point P and the multi-valued data generated when the G value in the magenta lines is at the point Q, and were evaluated in terms of the change in color tint and graininess. The evaluation results are shown in Table 4.

TABLE 4

|  | Dot adjacency (Lm) | Dot adjacency (M) | Change in color tint | Graininess |
|---|---|---|---|---|
| Lm 25% (Point P) | Low |  | Normal | Excellent |
|  | High |  | Good | Excellent |
| Lm 25% M 55% (Point Q) | Low | Low | Good | Good |
|  | High | High | Good | Normal |
|  | Low | Low | Good | Normal |
|  | High | High | Good | Normal |

As can be seen from Table 4, in the multi-valued data (point P) in which only the light magenta ink is used, a change in color tint due to thin-film interference occurs for recording with a low dot adjacency. In contrast, recording with a high dot adjacency increases the layer thickness of an ink layer to be formed, enabling the recording of an image with the effect of thin-film interference reduced and the change in color tint suppressed.

In the multi-valued data (point Q) in which both the light magenta ink and the magenta ink are used, in contrast, the layer thickness of an ink layer formed by the magenta ink increases, resulting in a reduction in the effect of thin-film interference on the entire image and no occurrence of a change in color tint. In addition, recording with a high dot adjacency for either type of ink will result in a significant reduction in graininess. For this reason, when both the light magenta ink and the magenta ink are used, recording with a low dot adjacency is preferable.

Images recorded with the use of each of the light magenta ink and the gray ink, each of which has a low dot height and will cause a change in tint when recorded without a combination with any other color, in combination of the other colors of ink were evaluated in terms of the change in color tint and graininess by using an evaluation method similar to that described above. Table 5 shows results of the evaluation performed using the light magenta ink in combination with the other colors of ink. Table 6 shows results of the evaluation performed using the gray ink in combination with the other colors of ink. In Table 5 and Table 6, a plurality of images in which the total recording duty of two types of ink regardless of any combination of types of ink was less than or equal to 50% were created, and, among the created images, the image with the largest change in color tint and the image with the lowest graininess were evaluated.

TABLE 5

| Ink combination | Dot adjacency (Lm) | Change in color tint | Graininess |
|---|---|---|---|
| Lm alone | Low | Normal | Excellent |
|  | High | Good | Excellent |
| C + Lm | Low | Good | Good |
|  | High | Good | Normal |
| M + Lm | Low | Good | Good |
|  | High | Good | Normal |
| Y + Lm | Low | Good | Excellent |
|  | High | Good | Good |
| K + Lm | Low | Good | Good |
|  | High | Good | Normal |

TABLE 5-continued

| Ink combination | Dot adjacency (Lm) | Change in color tint | Graininess |
|---|---|---|---|
| Lc + Lm | Low | Normal | Excellent |
|  | High | Good | Excellent |
| Gy + Lm | Low | Normal | Excellent |
|  | High | Good | Excellent |

TABLE 6

| Ink combination | Dot adjacency (Gy) | Change in color tint | Graininess |
|---|---|---|---|
| Gy alone | Low | Normal | Excellent |
|  | High | Good | Excellent |
| C + Gy | Low | Good | Good |
|  | High | Good | Normal |
| M + Gy | Low | Good | Good |
|  | High | Good | Normal |
| Y + Gy | Low | Good | Good |
|  | High | Good | Normal |
| K + Gy | Low | Good | Good |
|  | High | Good | Normal |
| Lc + Gy | Low | Normal | Excellent |
|  | High | Good | Excellent |

Referring to Table 5 and Table 6, it is experimentally observed that even an image recorded with the light magenta ink or the gray ink will cause no change in color tint due to thin-film interference if the cyan ink, the magenta ink, the yellow ink, or the black ink is additionally used. It is also observed that an image recorded with only the light magenta ink or the gray ink or an image recorded with the light magenta ink or the gray ink in combination with the light cyan ink might cause a change in color tint while the change in color tint can be suppressed by increasing the dot adjacency. Note that a color mixture of the light magenta ink or the gray ink and the light cyan ink will cause a change in color tint because it is considered that an ink layer of the light cyan ink has a lower dot height than that of the cyan ink and the like and thus the change in color tint due to thin-film interference on the ink layer of the light magenta ink or the cyan ink is difficult to suppress.

In view of the discussion described above, in this embodiment, during the processing of multi-valued data for the light magenta ink or the gray ink, a dither pattern whose dot adjacency is low when the total gradation value of the multi-valued data for the cyan ink, the magenta ink, the yellow ink, and the black ink is less than or equal to a predetermined threshold value is used for quantization. In this embodiment, a description will be given of the case where the threshold value for the total gradation of the multi-valued data is equal to 26 (a recording duty of 10%). The threshold value may be set to a different value, as appropriate, in accordance with the type or the like of the ink to be used.

The process for processing multi-valued data will be described in detail hereinbelow.

Figure 15:
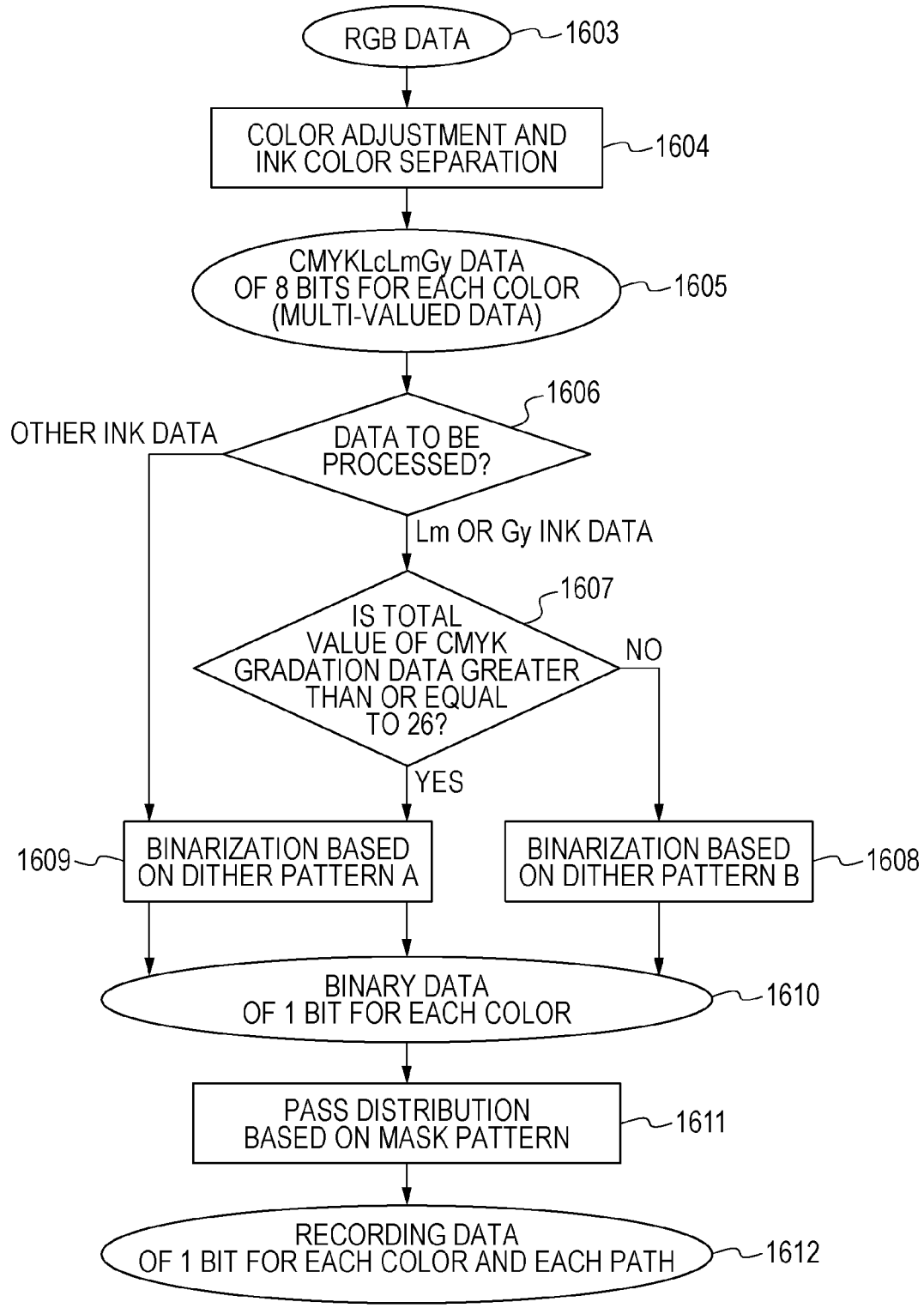
FIG. 15 is a block diagram illustrating a process for processing data according to the first and second embodiments.

FIG. 15 is a flowchart depicting the process of image processing performed by an image processing unit according to this embodiment. In FIG. 15, rectangular blocks represent individual image processing steps, and elliptical blocks represent the formats of data transferred from one image processing step to another.

First, in a color conversion process 1604, RGB image data 1603 acquired from the host computer 301 serving as an image input unit is adjusted to RGB data which is suitable for the image recording apparatus 1000 to perform data processing. Further, RGB data subjected to color adjustment is converted into CMYKLcLmGy multi-valued data 1605 corresponding to the ink colors used in this embodiment. This color conversion process is generally performed with reference to a lookup table. A specific conversion method involves replacing RGB values with cyan, magenta, and yellow (CMY), which are complementary colors of RGB, and replacing some of the achromatic color components described above with black (K). In addition, the C component is replaced with cyan and light cyan components, the M component with magenta and light magenta components, and the K component with black and gray components. As a result of the color conversion process 1604, CMYKLcLmGy multi-valued data 1605 is obtained. The CMYKLcLmGy multi-valued data 1605 is, for example, 8-bit data having 256 levels of gradation.

Then, the 8-bit CMYKLcLmGy multi-valued data 1605 is binarized. The process branches into different binarization flow paths in accordance with the type of ink. First, for data other than Lm or Gy data, binarization is performed in a first dithering process 1609 using a dither pattern A designed so that dot adjacency relatively decreases, described below.

For Lm or Gy data, on the other hand, the process proceeds to a gradation value determination process 1607 to select a different dither pattern in accordance with the gradation value of cyan-magenta-yellow-black (CMYK) data in a unit area. In a case where the gradation value per color is an 8-bit value in the range of 0 to 255 as described above, the process proceeds to a second dithering process 1608 if the total gradation value of CMYK data is less than 26 (the total recording duty is less than 10%). In the second dithering process 1608, binarization is performed using a dither pattern B designed so that dot adjacency relatively increases, described below. If the total gradation value of CMYK data is greater than or equal to 26 (the total recording duty is greater than or equal to 10%), the process proceeds to the first dithering process 1609. In the first dithering process 1609, binarization is performed using the dither pattern A.

As described above, as a result of binarization in either the first dithering process 1609 or the second dithering process 1608, binary data 1610 that specifies ejection or non-ejection of each type of ink to each of a plurality of pixel areas within the unit area is generated.

The reason for which the threshold value for selecting a dither pattern in the gradation value determination process 1607 is greater than or equal to 26 is as follows: As shown in Table 5 and Table 6, even if the Lm or Gy ink is used, the change in color tint due to thin-film interference on an ink layer of the Lm or Gy ink can be suppressed if the C, M, Y, or K ink is ejected. It is experimentally verified that the change in color tint caused by an ink layer of the Lm or Gy ink can be suppressed if the total recording duty for the C, M, Y, or K ink is greater than or equal to 10% (the total gradation value is greater than or equal to 26).

The binary data 1610 is further subjected to a masking process 1611, and is distributed into four scans on the unit area by using the mask pattern A described below. In the manner described above, ink is ejected in accordance with the pieces of recording data generated respectively for the four scans, thereby forming an image on the unit area.

The dithering operations (dithering techniques) performed in the first dithering process 1609 and the second dithering process 1608 will be described in detail hereinafter.

FIGS. 16A and 16B are schematic diagrams illustrating dither patterns applied in this embodiment. FIG. 16A illustrates the dither pattern A applied in the first dithering process 1609, in which binary data is generated so that dot adjacency relatively decreases. FIG. 16B illustrates the dither pattern B applied in the second dithering process 1608, in which binary data is generated so that dot adjacency relatively increases.

Binarization using a dither pattern is performed using a generally accepted method. In this embodiment, a dither pattern defined by a horizontal resolution of 1200 dpi and a vertical resolution of 1200 dpi is used. In this embodiment, each unit pixel and each recording pixel have the same resolution.

The dither pattern A and the dither pattern B used in this embodiment are determined so that an average of the numbers of adjacent pixels within the dither pattern B for which a threshold value lower than 64 is defined is larger than an average of the numbers of adjacent pixels within the dither pattern A for which a threshold value lower than 64 is defined. The dither patterns A and B are further determined so that an average of the numbers of adjacent pixels within the dither pattern B for which a threshold value lower than 128 is defined is larger than an average of the numbers of adjacent pixels within the dither pattern A for which a threshold value lower than 128 is defined.

A method for calculating an average of the numbers of adjacent pixels within a dither pattern for which a threshold value lower than a predetermined value is defined according to this embodiment will now be described.

FIGS. 27A to 27D are diagrams depicting a method for calculating the number of adjacent pixels according to this embodiment. In FIGS. 27A to 27D, a solid black portion represents a pixel for which a threshold value lower than a predetermined value is defined, and a solid white portion represents a pixel for which a threshold value greater than or equal to the predetermined value is defined.

In this embodiment, pixels at adjacent positions in the X direction and the Y direction are referred to as "adjacent pixels". For example, in FIG. 27A, 2 pixels×2 pixels, or four pixels in total, are adjacent pixels. In this case, the number of adjacent pixels is 4.

Figure 27A:
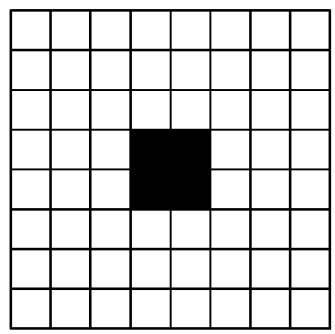
FIGS. 27A to 27D are diagrams depicting a method for calculating the number of low-threshold value pixels according to the first embodiment.
Figure 27B:
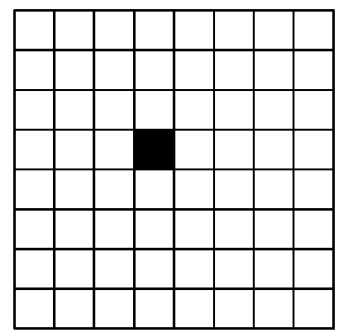

FIG. 27B illustrates the case where there are no pixels at adjacent positions for which a threshold value lower than a predetermined value is defined. In this case, the number of adjacent pixels is 1.

Figure 27C:
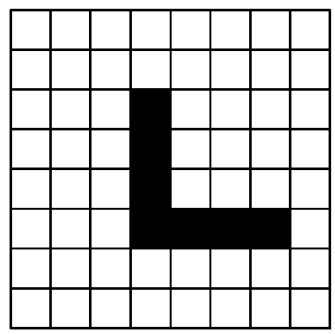

Further, even when pixels for which a threshold value lower than a predetermined value is defined are consecutively arranged in a biased orientation in a specific direction, such pixels are also referred to as "adjacent pixels". That is, in this embodiment, adjacent pixels are not limited to pixels forming an isotropic configuration as illustrated in FIG. 27A. In the illustration of FIG. 27C, pixels for which a threshold value lower than a predetermined value is defined are consecutively arranged in a biased orientation in a specific direction to form an L-shaped configuration. In this case, the number of adjacent pixels is 7.

Figure 27D:
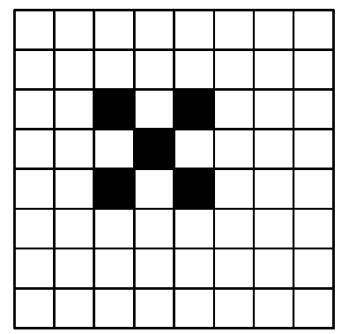

In this embodiment, furthermore, in addition to pixels consecutively arranged in the X direction and in the Y direction, when pixels for which a threshold value lower than a predetermined value is defined are consecutively arranged in a diagonal direction, such pixels are also referred to as "adjacent pixels". That is, there is a possibility that a total of eight pixels for which a threshold value lower than a predetermined value is defined, namely, two in the X direction, two in the Y direction, and four in the diagonal direction, will be arranged adjacent to a pixel for which a threshold value lower than a predetermined value is defined. In the illustration of FIG. 27D, pixels for which a threshold value lower than a predetermined value is defined are diagonally adjacent. In this case, the number of adjacent pixels is 5.

Figure 28A:
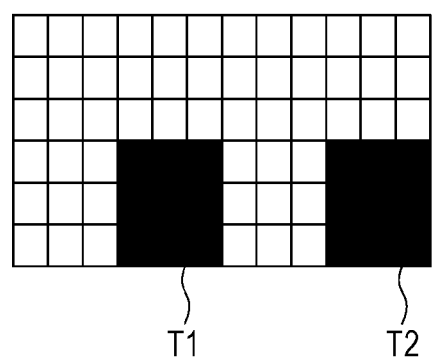
FIGS. 28A and 28B are diagrams depicting a method for calculating an average of the numbers of adjacent low-threshold value pixels according to the first embodiment.
Figure 28B:
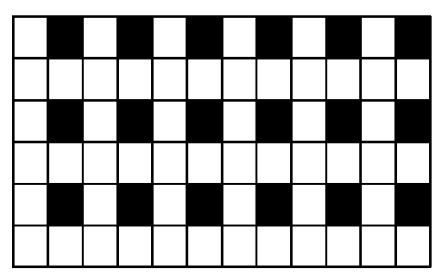

FIGS. 28A and 28B are diagrams depicting a method for calculating an average of the numbers of adjacent pixels among pixels within a dither pattern according to this embodiment for which a threshold value lower than a predetermined value is defined.

For simplicity, the description will be made using a dither pattern in which a plurality of threshold values are defined for 72 pixels, namely, 12 pixels in the X direction and 6 pixels in the Y direction. In FIGS. 28A and 28B, solid black portions represent pixels for which a threshold value lower than a predetermined value is defined, and solid white portions represent pixels for which a threshold value greater than or equal to the predetermined value is defined.

In this embodiment, the number of pixel groups each having adjacent pixels within a dither pattern for which a threshold value lower than a predetermined value is defined is calculated. Further, the sum of the numbers of pixels within the dither pattern for which a threshold value lower than the predetermined value is defined is calculated. Then, the sum of the numbers of pixels for which a threshold value lower than the predetermined value is defined is divided by the number of pixel groups each having adjacent pixels for which a threshold value lower than the predetermined value is defined to yield an average of the numbers of adjacent pixels within the dither pattern.

For example, the dither pattern illustrated in FIG. 28A includes pixel groups T1 and T2, each having nine adjacent pixels for which a threshold value lower than a predetermined value is defined. Thus, the average of the numbers of adjacent pixels within the dither pattern illustrated in FIG. 28A for which a threshold value lower than a predetermined value is defined is equal to a value obtained by dividing 18, which is the sum of the numbers of pixels within the dither pattern for which a threshold value lower than the predetermined value is defined, by 2, which is the number of pixel groups each having adjacent pixels for which a threshold value lower than the predetermined value is defined. That is, the average of the numbers of adjacent pixels within the dither pattern illustrated in FIG. 28A for which a threshold value lower than the predetermined value is defined is equal to 9.

In contrast, the dither pattern illustrated in FIG. 28B does not include a pixel for which a threshold value lower than a predetermined value is defined and which is adjacent to another pixel for which a threshold value lower than the predetermined value is defined. In other words, according to the definition described above, there are a total of 18 pixel groups each having adjacent pixels for which a threshold value lower than the predetermined value is defined. Thus, the average of the numbers of adjacent pixels within the dither pattern illustrated in FIG. 28B for which a threshold value lower than the predetermined value is defined is equal to a value obtained by dividing 18, which is the sum of the numbers of pixels within the dither pattern for which a threshold value lower than the predetermined value is defined, by 18, which is the number of pixel groups each having adjacent pixels for which a threshold value lower than the predetermined value is defined. That is, the average of the numbers of adjacent pixels within the dither pattern illustrated in FIG. 28B for which a threshold value lower than the predetermined value is defined is equal to 1.

The dither patterns A and B illustrated in FIGS. 16A and 16B, which are used in this embodiment, will be described in detail on the basis of the definitions described above.

In the dither pattern A illustrated in FIG. 16A, threshold values for individual pixels are defined so that pixels for which a threshold value lower than 64 is defined are not adjacent. That is, the average of the numbers of adjacent pixels within the dither pattern A for which a threshold value lower than 64 is defined is equal to 1. Thus, for example, when multi-valued data having a gradation value of 64 is input to the first dithering process 1609, the binary data illustrated in FIG. 10A is generated. Accordingly, ink can be ejected to the positions illustrated in FIG. 10B to form dots.

In the dither pattern A, furthermore, threshold values for individual pixels are defined so that an average of the numbers of adjacent pixels for which a threshold value lower than 128 is defined is equal to 8. Thus, for example, when multi-valued data having a gradation value of 128 is input to the first dithering process 1609, the binary data illustrated in FIG. 10C is generated. Accordingly, dots can be formed at the positions illustrated in FIG. 10D.

In the dither pattern B illustrated in FIG. 16B, in contrast, threshold values for individual pixels are defined so that pixels for which a threshold value lower than 64 is defined are adjacent. Specifically, the average of the numbers of adjacent pixels within the dither pattern B for which a threshold value lower than 64 is defined is equal to 2. Thus, for example, when multi-valued data having a gradation value of 128 is input to the second dithering process 1608, the binary data illustrated in FIG. 11A is generated by using the dither pattern B. Accordingly, dots can be formed at the positions illustrated in FIG. 11C.

In the dither pattern B, furthermore, threshold values for individual pixels are defined so that an average of the numbers of adjacent pixels for which a threshold value lower than 128 is defined is equal to 16. Thus, for example, when multi-valued data having a gradation value of 128 is input to the second dithering process 1608, the binary data illustrated in FIG. 11B is generated. Accordingly, dots can be formed at the positions illustrated in FIG. 11D.

In the manner described above, in this embodiment, the dithering operation is performed in the first dithering process 1609 and the second dithering process 1608 by using two dither patterns in which the averages of the numbers of adjacent pixels among pixels within a dither pattern for which a relatively low threshold value is defined are different.

The masking operation performed by the masking process 1611 will be described in detail hereinafter.

FIGS. 17A to 17D are schematic diagrams illustrating mask patterns applied in this embodiment. FIGS. 17A, 17B, 17C, and 17D illustrate mask patterns used for distribution of the binary data 1610 generated in the first dithering process 1609 and the second dithering process 1608 into the first, second, third, and fourth scans on each unit area.

Figure 17A:
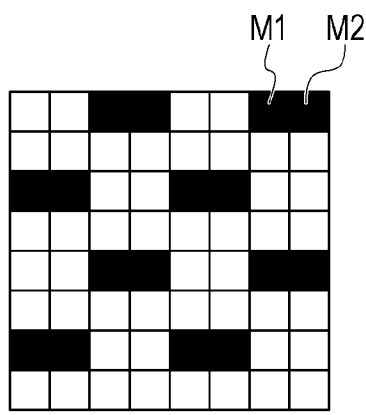
FIGS. 17A to 17D are diagrams illustrating a mask pattern used in the first embodiment.

In the mask pattern illustrated in FIG. 17A, which corresponds to the first scan, a recording-permitting pixel M1 and a recording-permitting pixel M2 are arranged at positions corresponding to two adjacent pixels D1 and D2 in the dither pattern B illustrated in FIG. 16B for which a threshold value lower than 64 is defined, respectively. Accordingly, recording data for allowing ink to be ejected to the pixel areas corresponding to the pixel D1 and the pixel D2 during the first scan, when ink is to be ejected, is generated.

Figure 17B:
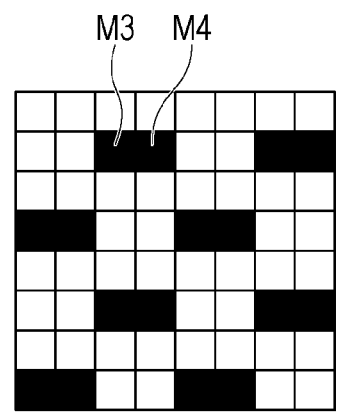

In addition, in the mask pattern illustrated in FIG. 17B, which corresponds to the second scan, a recording-permitting pixel M3 and a recording-permitting pixel M4 are arranged at positions corresponding to two adjacent pixels D3 and D4 in the dither pattern B illustrated in FIG. 16B for which a threshold value lower than 64 is defined, respectively. Accordingly, recording data for allowing ink to be ejected to the pixel areas corresponding to the pixel D3 and the pixel D4 during the second scan, when ink is to be ejected, is generated.

Figure 17C:
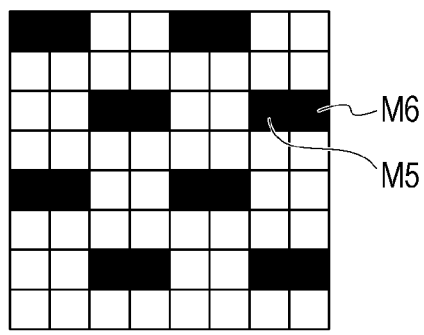
Figure 17D:
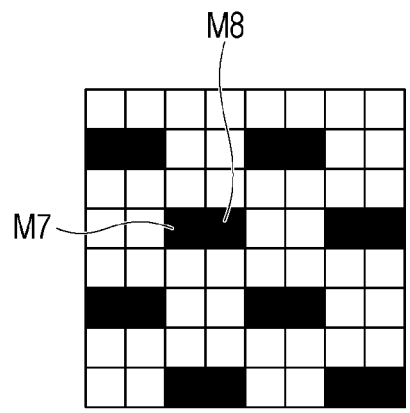

Likewise, in the dither pattern illustrated in FIG. 16B and the mask pattern illustrated in FIG. 17C, which corresponds to the third scan, two adjacent pixels D5 and D6 for which a threshold value lower than 64 is defined, and recording-permitting pixels M5 and M6 are located at corresponding positions, respectively. Further, in the dither pattern illustrated in FIG. 16B and the mask pattern illustrated in FIG. 17D, which corresponds to the fourth scan, two adjacent pixels D7 and D8 for which a threshold value lower than 64 is defined, and recording-permitting pixels M7 and M8 are located at corresponding positions, respectively.

In this embodiment, as described above, in the process of image processing illustrated in FIG. 15, recording data 1612 is generated through the dithering operation by using the dither patterns illustrated in FIGS. 16A and 16B and through the masking operation by using the mask patterns illustrated in FIGS. 17A to 17D.

A description will now be given of recording data generated when the total gradation value of CNYK data is less than 26 (the total recording duty is less than 10%) and when Lm or Gy data is to be processed.

Figure 18:
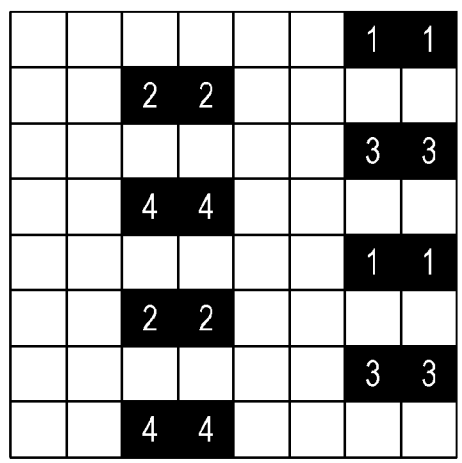
FIG. 18 is a schematic diagram illustrating recording data generated in the first embodiment.

FIG. 18 is a schematic diagram depicting recording data generated from Lm or Gy data having a gradation value of 64 (a recording duty of 25%) when the total gradation value of CMYK data is less than 26 (the total recording duty is less than 10%). In FIG. 18, solid black portions represent pixels for which ink is to be ejected, and numbers in the pixels each represent the position of the current scan during which ink is ejected for the associated pixel in the sequence of scans.

As can be understood from FIG. 18, this embodiment enables the Lm or Gy ink to be ejected to adjacent pixel areas even if the recording duty for the Lm or Gy ink having a low dot height is low. Thus, even when the CMYK ink is ejected a relatively small amount and thin-film interference is likely to occur, recording can be implemented with a high dot height for the Lm or Gy ink. Accordingly, recording with the effect of thin-film interference reduced and the change in color tint suppressed is achievable.

Second Embodiment

In the first embodiment, a description has been given of the arrangement of a plurality of recording-permitting pixels at positions in a single mask pattern which correspond to a plurality of adjacent pixels within the dither pattern B for which a relatively low threshold value is defined.

In this embodiment, a description will be given of the arrangement of recording-permitting pixels at positions in a single mask pattern which correspond to some pixels among the plurality of pixels and the arrangement of recording-permitting pixels at positions in another mask pattern which correspond to other pixels among the plurality of pixels.

Portions similar to those in the first embodiment described above are not described herein.

Figure 19A:
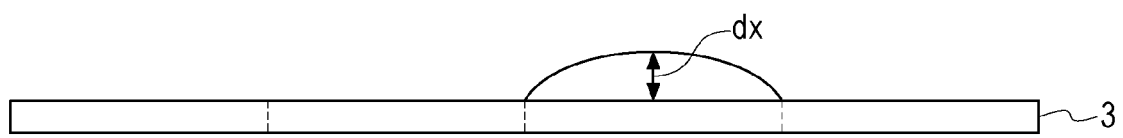
FIGS. 19A to 19C are diagrams depicting a dot height when dots are adjacent to each other.
Figure 19B:
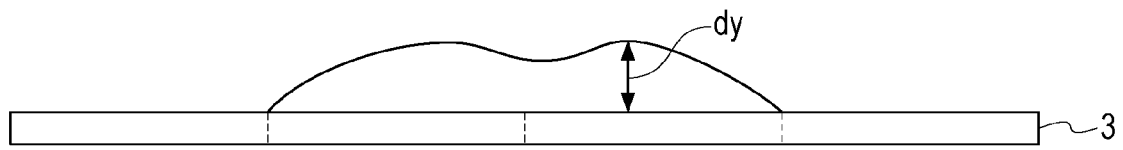
Figure 19C:
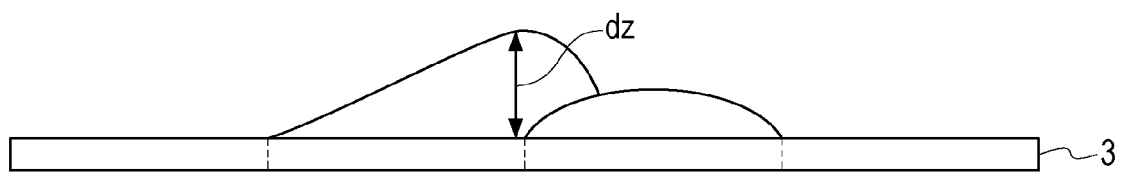

FIGS. 19A to 19C are diagrams schematically illustrating the heights of dots formed when ink is ejected onto a recording medium. FIG. 19A illustrates a dot formed when ink is ejected to one pixel area on the recording medium. FIG. 19B illustrates dots formed when ink is ejected to two adjacent pixel areas on the recording medium during the same scan. FIG. 19C illustrates dots formed when ink is ejected to two adjacent pixel areas on the recording medium during different scans.

When ink is ejected to adjacent pixel areas during the same scan, ink drops formed immediately after the ink drops have been applied to the recording medium are brought into contact with each other in a liquid state. The ink drops are thus attracted to each other and gather due to the surface tension. Accordingly, a height dy of the formed dots is higher than a height dx of a dot formed when ink is ejected to one pixel area.

When ink is ejected to adjacent pixel areas during different scans, a dot formed during the previous scan has been fixed to the recording medium when ink is ejected during the subsequent scan. Thus, ink is ejected during the subsequent scan so as to form a dot which is partially superimposed on the dot that has been formed during the previous scan. As a result, the dot formed during the subsequent scan has a height dz higher than the height dy of the dots formed when ink is ejected to adjacent pixel areas during the same scan.

In the manner described above, in a case where ink is ejected to a plurality of adjacent pixel areas, dots formed when ink is ejected to plurality of adjacent pixel areas during different scans have a higher height than dots formed when ink is ejected to the plurality of pixel areas during the same scan. Accordingly, the effect of thin-film interference caused when ink having a low dot height is used may be reduced.

In this embodiment, accordingly, the ejection of the Lm or Gy ink having a low dot height is controlled so that when the CMYK ink is ejected a small amount, the Lm or Gy ink is ejected to a plurality of adjacent pixel areas during different scans.

The process of image processing and the dither patterns to be used are those illustrated in FIG. 15 and FIGS. 16A and 16B, as in the first embodiment.

FIGS. 20A to 20D are schematic diagrams illustrating a mask pattern applied in this embodiment. FIGS. 20A, 20B, 20C, and 20D illustrate mask patterns to be used for the binary data 1610 generated in the first dithering process 1609 and the second dithering process 1608 to be distributed into the first, second, third, and fourth scans for each unit area, respectively.

Figure 20A:
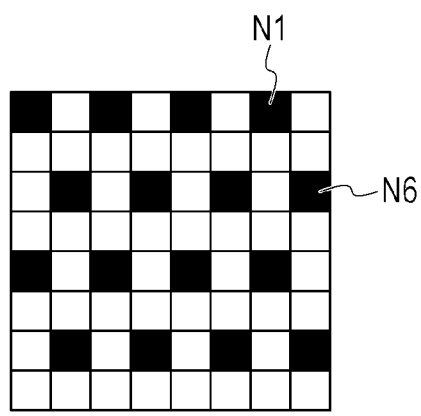
FIGS. 20A to 20D are diagrams illustrating a mask pattern used in a second embodiment.

In the mask pattern illustrated in FIG. 20A, which corresponds to the first scan, a recording-permitting pixel N1 is arranged at the position corresponding to the pixel D1 among the two adjacent pixels D1 and D2 within the dither pattern B illustrated in FIG. 16B for which a threshold value lower than 64 is defined. In the mask pattern illustrated in FIG. 20C, which corresponds to the third scan, a recording-permitting pixel N2 is arranged at the position corresponding to the pixel D2 within the dither pattern B illustrated in FIG. 16B for which a threshold value lower than 64 is defined. Accordingly, in a case where ink is ejected to the pixel areas corresponding to the pixels D1 and D2, recording data which allows an ink droplet to be ejected to the pixel area corresponding to the pixel D1 during the first scan and an ink droplet to be ejected to the pixel area corresponding to the pixel D2 during the third scan is generated.

Figure 20B:
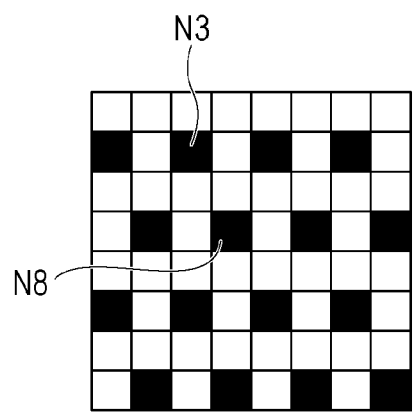

Further, in the mask pattern illustrated in FIG. 20B, which corresponds to the second scan, a recording-permitting pixel N3 is arranged at the position corresponding to the pixel D3 among the two adjacent pixels D3 and D4 within the dither pattern B illustrated in FIG. 16B for which a threshold value lower than 64 is defined. In the mask pattern illustrated in FIG. 20D, which corresponds to the fourth scan, a recording-permitting pixel N4 is arranged at the position corresponding to the pixel D4 within the dither pattern B illustrated in FIG. 16B for which a threshold value lower than 64 is defined. Accordingly, in a case where ink is ejected to the pixel areas corresponding to the pixels D3 and D4, recording data which allows an ink droplet to be ejected to the pixel area corresponding to the pixel D3 during the second scan and an ink droplet to be ejected to the pixel area corresponding to the pixel D4 during the fourth scan is generated.

Figure 20C:
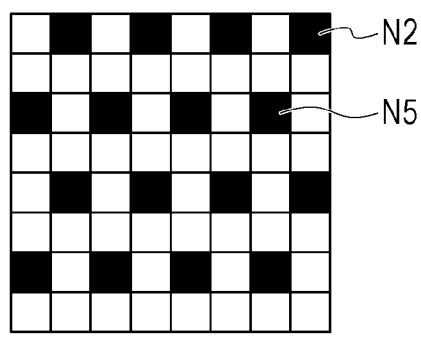
Figure 20D:
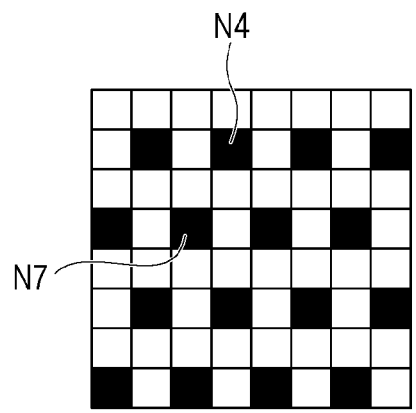

Further, in the mask pattern illustrated in FIG. 20C, which corresponds to the third scan, a recording-permitting pixel N5 is arranged at the position corresponding to the pixel D5 among the two adjacent pixels D5 and D6 within the dither pattern B illustrated in FIG. 16B for which a threshold value lower than 64 is defined. In the mask pattern illustrated in FIG. 20A, which corresponds to the first scan, a recording-permitting pixel N6 is arranged at the position corresponding to the pixel D6 within the dither pattern B illustrated in FIG. 16B for which a threshold value lower than 64 is defined. Further, in the mask pattern illustrated in FIG. 20D, which corresponds to the fourth scan, a recording-permitting pixel N7 is arranged at the position corresponding to the pixel D7 among the two adjacent pixels D7 and D8 within the dither pattern B illustrated in FIG. 16B for which a threshold value lower than 64 is defined. In the mask pattern illustrated in FIG. 20B, which corresponds to the second scan, a recording-permitting pixel N8 is arranged at the position corresponding to the pixel D8 within the dither pattern B illustrated in FIG. 16B for which a threshold value lower than 64 is defined.

In this embodiment, in the process of image processing illustrated in FIG. 15, the recording data 1612 is generated through the dithering operation by using the dither patterns illustrated in FIGS. 16A and 16B and through the masking operation by using the mask patterns illustrated in FIGS. 20A to 20D.

Figure 21:
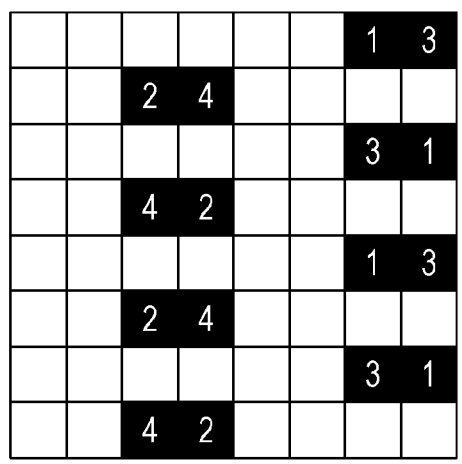
FIG. 21 is a schematic diagram illustrating recording data generated in the second embodiment.

FIG. 21 is a schematic diagram depicting recording data generated from the Lm or Gy data having a gradation value of 64 (a recording duty of 25%) when the total gradation value of CNYK data is less than 26 (the total recording duty is less than 10%). In FIG. 21, solid black portions represent pixels for which ink is to be ejected, and numbers in the pixels each represent the position of the current scan during which ink is ejected for the associated pixel in the sequence of scans.

As can be understood from FIG. 21, this embodiment enables the Lm or Gy ink to be ejected to adjacent pixel areas even if the recording duty of for the Lm or Gy ink having a low dot height is low. This embodiment also enables the Lm or Gy ink to be ejected to adjacent pixel areas during different scans. Accordingly, this embodiment enables recording with the height of a dot formed by the Lm or Gy ink being made higher than the height of a dot formed by the Lm or Gy ink during the same scan on adjacent pixel areas. Thus, even when the CMYK ink is ejected a relatively small amount, the effect of thin-film interference may further be reduced, and recording with the change in color tint being significantly suppressed is achievable.

Third Embodiment

In the first and second embodiments, a description has been given of the case where the dithering operation is performed on Lm or Gy data by using a different single dither pattern when the gradation value of CMYK data is low.

In this embodiment, a description will be given of the case where one of a plurality of different dither patterns is selected in accordance with the gradation value of CMYK data and the dithering operation is performed on Lm or Gy data by using the selected dither pattern.

Portions similar to those in the first and second embodiments described above are not described herein.

The dot height on an image formed on a unit area increases as the total duty of the CMYK ink for the unit area increases. That is, as the amount of CMYK ink to be ejected increases, the need for dots formed by the Lm or Gy ink to be adjacent to each other decreases.

Table 7 shows the degree of change in the color tint of an image formed when the total duty for the CMYK ink is changed and further when the adjacency ratio for dots formed by the Lm or Gy ink is changed at individual amounts of CMYK ink to be ejected. In either case, recording was performed with a duty of 25% for the Lm or Gy ink.

In this embodiment, the term "dot adjacency ratio" refers to the ratio of the number of dots formed in adjacent pixel areas to the number of dots recorded per unit area. For example, when dots are formed in the manner illustrated in FIG. 10B, none of the dots has other dots formed in an adjacent pixel area. Thus, the dot adjacency ratio is 0%. When dots are formed in the manner illustrated in FIG. 11B, each of the dots has one other dot formed in an adjacent pixel area. Thus, the dot adjacency ratio is 100%.

TABLE 7

| | | Dot adjacency ratio for Lm or Gy ink | | |
|---|---|---|---|---|
| | | 0% | 50% | 100% |
| Total CMYK ink duty | 0 to 10% | Normal | Normal | Good |
| | 10% to 25% | Normal | Good | Good |
| | Greater than 25% | Good | Good | Good |

As can be seen from Table 7, in a case where the total duty for the CMYK ink is 0 to 10%, a change in color tint is observed when the dot adjacency ratio for the Lm or Gy ink is 0 to 75%. In a case where the total duty for the CMYK ink is 10 to 25%, a change in color tint is observed when the dot adjacency ratio for the Lm or Gy ink is 0 to 25%. In a case where the total duty for the CMYK ink is greater than 25% (the total gradation value is greater than 64), no change in color tint is observed even if dots formed by the Lm or Gy ink are not adjacent to each other.

On the other hand, as the dot adjacency ratio increases, the graininess of an image to be obtained decreases. It is thus preferable that recording be performed with a dot adjacency ratio as low as possible unless a change in color tint occurs.

In view of the foregoing discussion, in this embodiment, the adjacency ratio for dots formed by the Lm or Gy ink is controlled in the form shown in Table 8 in accordance with the total duty for the CMYK ink.

TABLE 8

| CMYK ink duty | Dot adjacency ratio for Lm or Gy ink |
|---|---|
| 0 to 10% | 100% |
| 10% to 25% | 50% |
| Greater than 25% | 0% |

Figure 22:
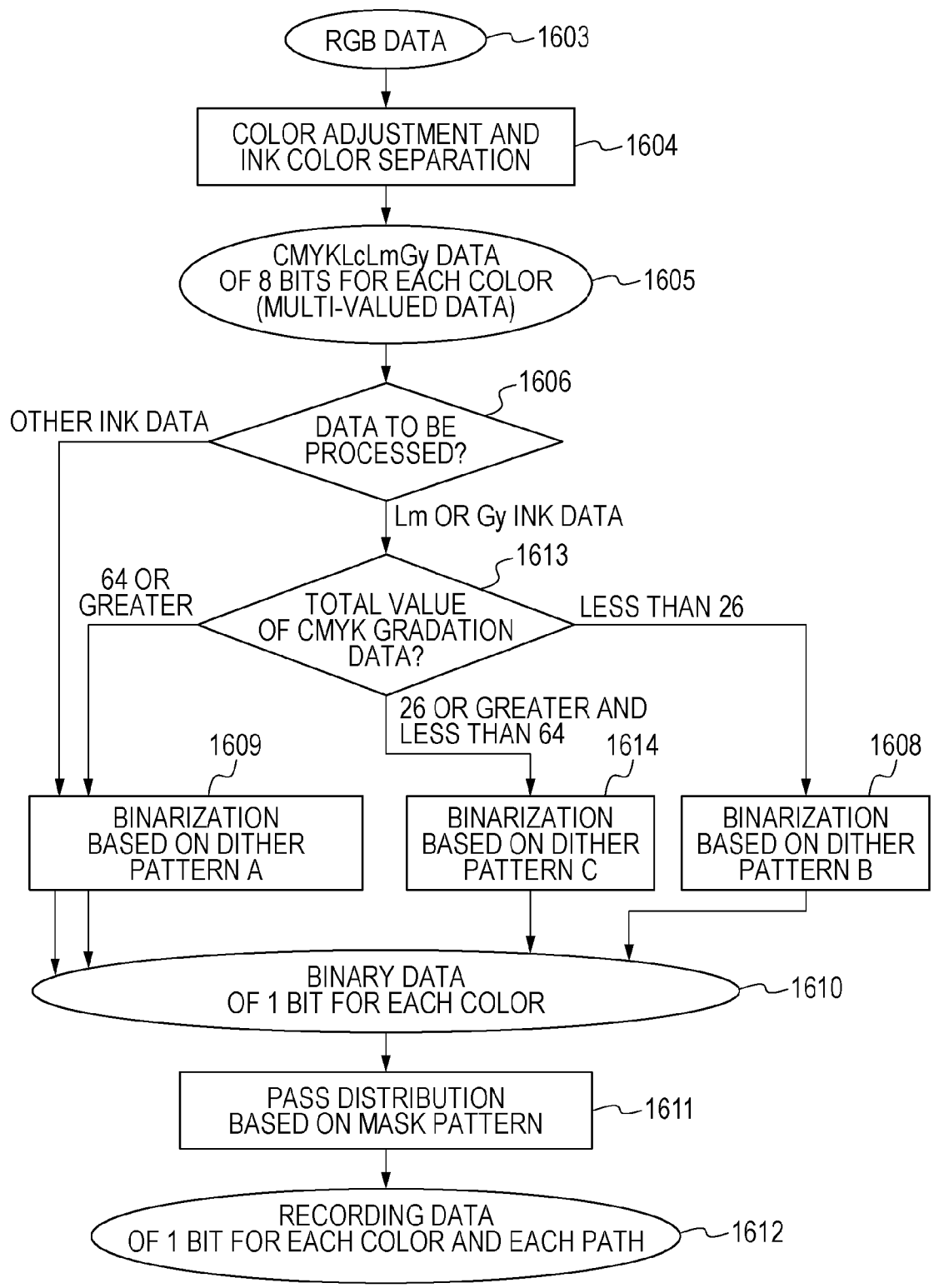
FIG. 22 is a block diagram illustrating a process for processing data according to a third embodiment.

FIG. 22 is a flowchart depicting the process of image processing performed by an image processing unit according to this embodiment. The processing operations other than a gradation value determination process 1613 for determining the total for CMYK data and a third dithering process 1614 are substantially the same as the processing operations illustrated in FIG. 15 according to the first embodiment.

In this embodiment, when Lm or Gy data is to be processed, in the gradation value determination process 1613, which of three dithering processes is used to binarize the Lm or Gy data is determined in accordance with the gradation value of CMYK data in a unit area. Specifically, when the total gradation value of CMYK data is less than 26 (the total recording duty is less than 10%), the process proceeds to the second dithering process 1608. In the second dithering process 1608, binarization is performed by using the dither pattern B illustrated in FIG. 16B. If the total gradation value of CMYK data is greater than or equal to 64 (the total recording duty is greater than or equal to 25%), the process proceeds to the first dithering process 1609. In the first dithering process 1609, binarization is performed by using the dither pattern A illustrated in FIG. 16A. If the total gradation value of CMYK data is greater than or equal to 26 (the total recording duty is greater than or equal to 10%) and is less than 64 (the total recording duty is less than 25%), the process proceeds to the third dithering process 1614. In the third dithering process 1614, binarization is performed by using a dither pattern C, described below, in which the dot adjacency of the binary data to be generated has approximately an intermediate value.

As described above, in this embodiment, the binarization operation is performed by using any one of the first dithering process 1609, the second dithering process 1608, and the third dithering process 1614. Accordingly, the binary data 1610 that specifies ejection or non-ejection of each type of ink to each of a plurality of pixel areas within the unit area is generated.

The dithering operation performed in the third dithering process 1614 will be described in detail hereinafter.

FIG. 23 is a schematic diagram illustrating the dither pattern C applied in the third dithering process 1614 according to this embodiment, in which the dot adjacency ratio is 50% (the dot adjacency has approximately an intermediate value).

Among pixels within the dither pattern C illustrated in FIG. 23 for which a threshold value lower than 64 is defined, a pixel E1 and a pixel E2 are located at adjacent positions. Similarly, a pixel E7 and a pixel E8 are also adjacent to each other. On the other hand, no pixel for which a threshold value lower than 64 is defined is located at a position adjacent to a pixel E3, a pixel E4, a pixel E5, or a pixel E6. That is, the average of the numbers of adjacent pixels among the pixels within the dither pattern C for which a threshold value lower than 64 is defined is equal to 1.3 (=(1×4+2×2)÷6). Further, the ratio of the number of pixels at adjacent positions for which a threshold value lower than 64 is defined to the number of pixels within the dither pattern C for which a threshold value lower than 64 is defined is equal to 50%. Accordingly, for example, when Lm or Gy data whose multi-valued data has a gradation value of 64 is input to the third dithering process, binary data according to which dots are formed so that the dot adjacency has approximately an intermediate value (the dot adjacency ratio is 50%) can be generated.

As described above, in this embodiment, it may be possible to control the degree of adjacency between dots formed by the ejection of the Lm or Gy ink at three levels or more in accordance with the amount of CMYK ink to be ejected. Thus, the effect of thin-film interference may further be reduced, and the change in color tint may be more effectively suppressed.

Fourth Embodiment

In the first through third embodiments, a description has been given of the case where multi-valued data is binarized by using a dither pattern.

In contrast, in this embodiment, a description will be given of the case where multi-valued data is subjected to multi-value quantization to generate multi-valued quantized data and the multi-valued quantized data is further binarized by using an index pattern to generate recording data.

In this embodiment, an image processing unit in the host computer 301 performs a color conversion process and a multi-value quantization process, and transmits multi-valued quantized data generated through the multi-value quantization process to an image processing unit in the image recording apparatus 1000. The image processing unit in the image recording apparatus 1000 performs an index development process and a masking process on the multi-valued quantized data to generate recording data.

Figure 24:
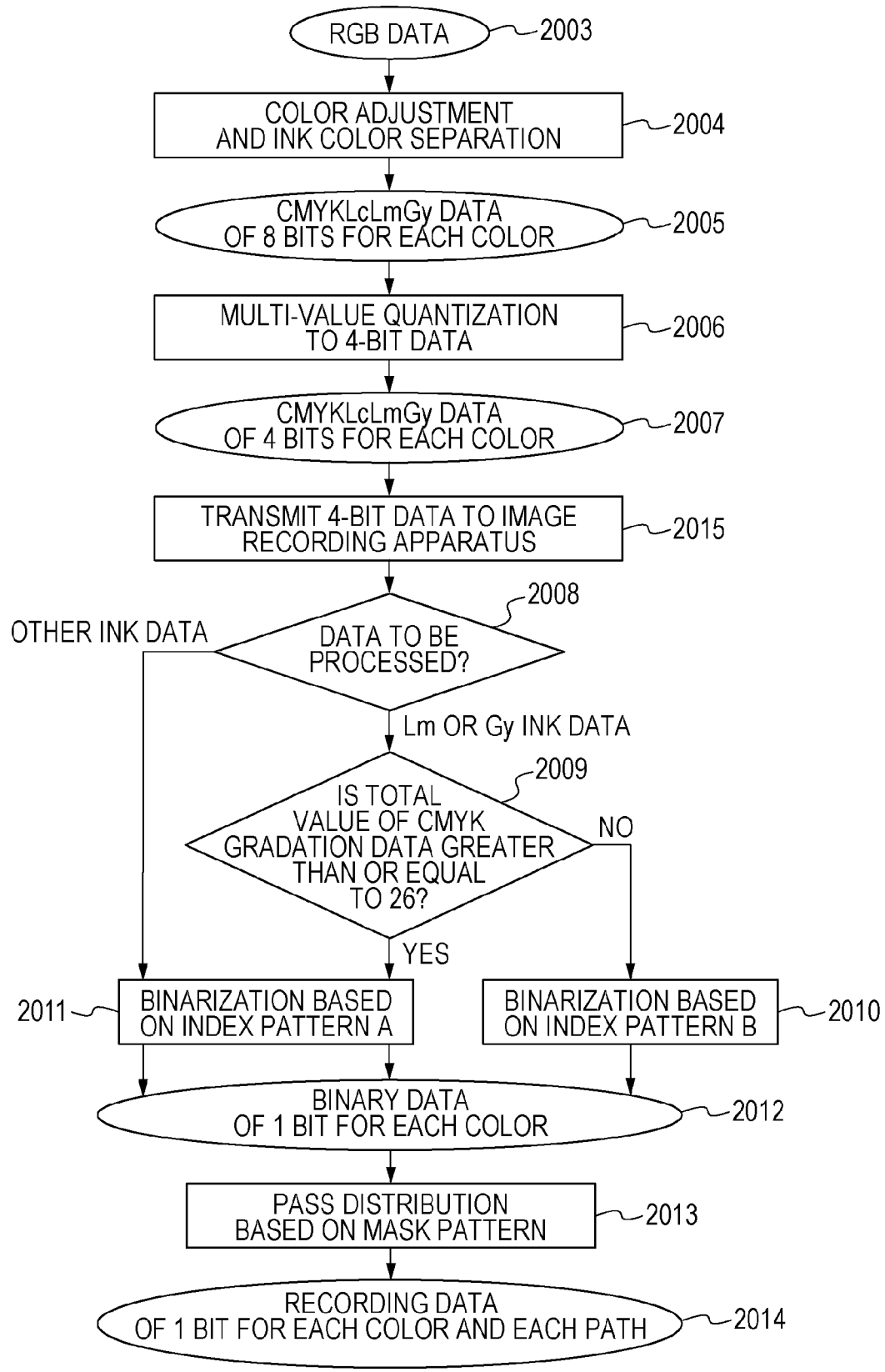
FIG. 24 is a block diagram illustrating a process for processing data according to a fourth embodiment.

FIG. 24 is a flowchart depicting the process of image processing performed by an image processing unit according to this embodiment. A color conversion process 2004, a gradation value determination process 2009, and a masking process 2013 are substantially the same as the color conversion process 1604, the gradation value determination process 1607, and the masking process 1611 illustrated in FIG. 15 according to the first embodiment, respectively, and are not described here.

In a multi-value quantization process 2006, 8-bit multi-valued data 2005 of 0 to 255 levels, which is generated by the color conversion process 2004, is subjected to multi-value quantization to produce 4-bit multi-valued quantized data 2007 of 0 to 8 levels. The method for multi-value quantization may be implemented by a variety of methods such as dithering and error diffusion.

In a transmission process 2015, the 4-bit multi-valued quantized data 2007 is transmitted from the host computer 301 to the image recording apparatus 1000.

In this embodiment, a first index development process 2011 and a second index development process 2010 are executed instead of the first dithering process 1609 and the second dithering process 1608 illustrated in FIG. 15 according to the first embodiment, respectively. The index development process is a process for converting multi-valued quantized data having several levels, which is input from the host computer 301, into binary data that specifies recording or non-recording of dots which are recordable by the image recording apparatus 1000.

Figures 25A, 25B:
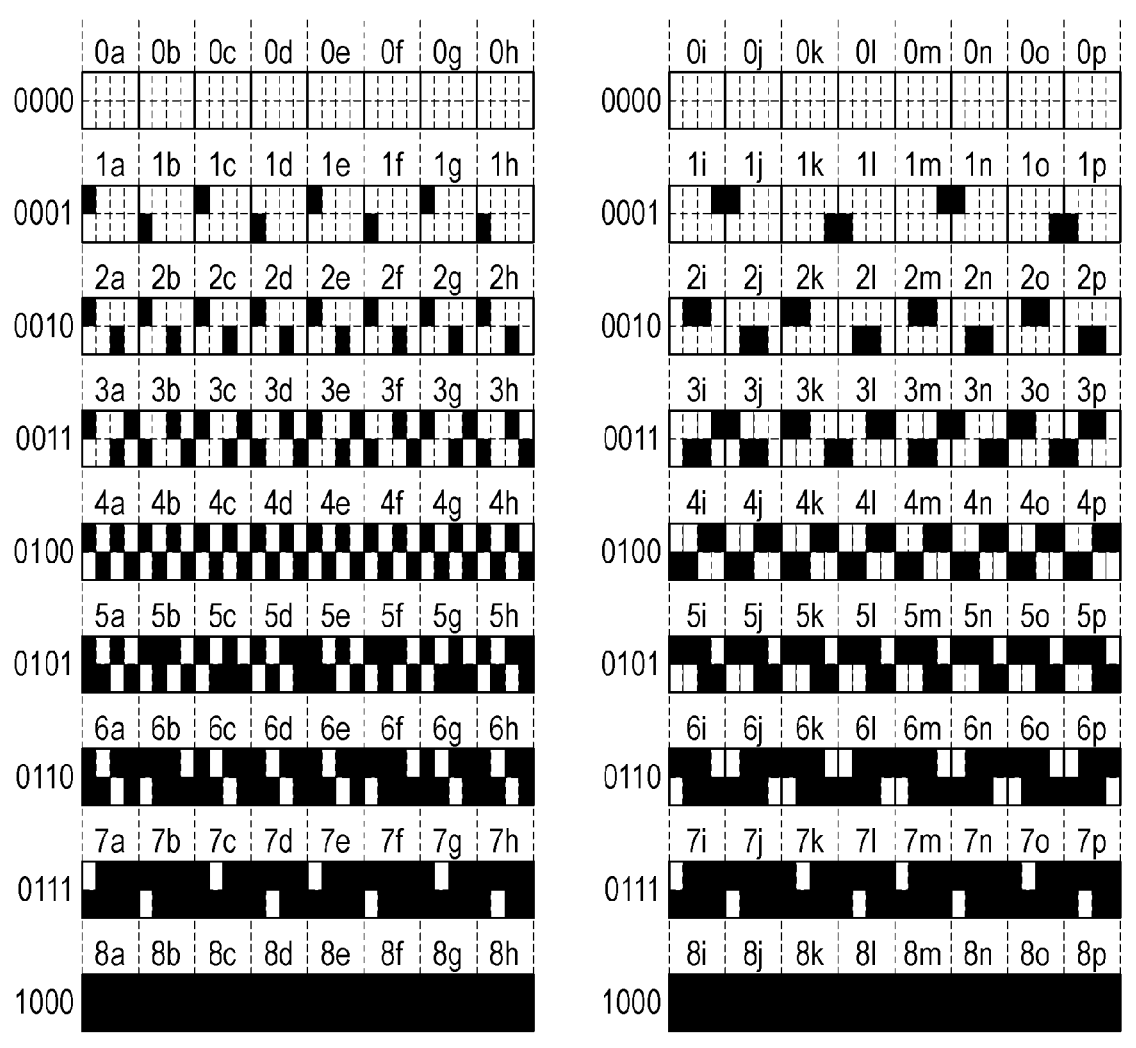

FIGS. 25A and 25B are diagrams depicting index patterns applied in this embodiment. FIG. 25A is a diagram illustrating an index pattern A applied to the first index development process 2011. FIG. 25B is a diagram illustrating an index pattern B applied to the second index development process 2010. Further, the values 0000 to 1000 of multi-valued quantized data on the left side of each of the index patterns A and B represent the levels of gradation of 4-bit multi-valued quantized data that is input from a host apparatus. Further, a solid black portion represents a pixel for which a dot is to be recorded, and a solid white portion represents a pixel for which a dot is not to be recorded.

In this embodiment, as indicated by individual rectangular blocks, recording or non-recording of dots is determined for each of pixels arranged at a resolution of 1200 dpi in the X direction and 1200 dpi in the Y direction. Further, eight adjacent pixels form a single unit pixel for the representation of gradation. As can be understood from the index patterns A and B illustrated in FIGS. 25A and 25B, as the value of gradation data increases by one level, the number of pixels for which recording within a single unit pixel is determined increases by one.

As illustrated in FIG. 25A, in this embodiment, eight types of index patterns A each corresponding to one gradation value of multi-valued quantized data are prepared. For example, for multi-valued quantized data 0001, an index patterns A having 1a to 1h for each unit pixel are prepared. Actually, one of them is associated with each unit pixel. Preparing a plurality of index patterns in the manner described above allows rotational use of the index patterns. That is, even if pieces of multi-valued quantized data having the same gradation value are consecutively input, dots can be arranged by using various index patterns in combination, thus allowing variations in ejection characteristics between ejection ports and various errors included in an image recording apparatus to be less pronounced on an image. In this embodiment, eight index patterns for each of the gradation values illustrated in FIG. 25A are used rotationally in the X direction. For example, when pieces of multi-valued quantized data having the same gradation value in the X direction, like 0001, 0001, and 0001, are input to consecutive unit pixels, a pattern of 1a, 1b, and 1c is output. When pieces of multi-valued quantized data having gradation values 0001, 0010, and 0001 in the X direction are input, a pattern of 1a, 2b, and 1c is output.

As illustrated in FIG. 25B, in this embodiment, similarly to the index patterns A, eight types of index patterns B each corresponding to each piece of multi-valued quantized data are prepared. Here, index patterns corresponding to gradation values 0001, 0010, 0011, and 0100 are determined so that the number of pixels for which recording is determined and to which a pixel for which other recording is determined is located at a position adjacent within the index pattern B is larger than the number of pixels for which recording is determined and to which a pixel for which other recording is determined is located at a position adjacent within the index pattern A. Thus, if the gradation value of CMYK multi-valued quantized data is low, Lm or Gy multi-valued quantized data is binarized in the second index development process 2010 by using the index pattern B, thus enabling the generation of binary data having a high dot adjacency.

As described above, this embodiment enables recording with a high dot adjacency for the Lm or Gy ink having a low dot height if the CMYK ink is ejected a small amount, even when quantization is performed by using an index development process. Accordingly, recording with the effect of thin-film interference reduced and the change in color tint suppressed is achievable.

In this embodiment, 4-bit multi-valued quantized data is generated through the multi-value quantization process 2006. However, the multi-value quantization process may not necessarily be performed. That is, 8-bit multi-valued data 2005 generated through the color conversion process 2004 may be transmitted to the image recording apparatus 1000. Then, the 8-bit multi-valued data 2005 may be binarized in the first index development process 2011 and the second index development process 2010 by using respective index patterns. Note that, as described in this embodiment, a multi-value quantization process performed before data is transmitted can reduce the amount of data to be transmitted to the image recording apparatus 1000 from 8 bits to 4 bits, and can therefore reduce the time required for transmission.

Fifth Embodiment

In the first through fourth embodiments, a description has been given of an image processing method performed by a recording apparatus that employs the so-called multi-pass recording method which allows recording by performing a scanning and recording operation on a unit area on a recording medium a plurality of times.

In this embodiment, a description will be given of an image processing method performed by a recording apparatus that employs a recording method which allows recording by using a plurality of recording heads each corresponding to one type of ink and each having a length corresponding to the entire width of a recording medium and by performing a relative scanning and recording operation once between the recording heads and the recording medium.

Portions similar to those in the first through fourth embodiments described above are not described herein.

Figure 26:
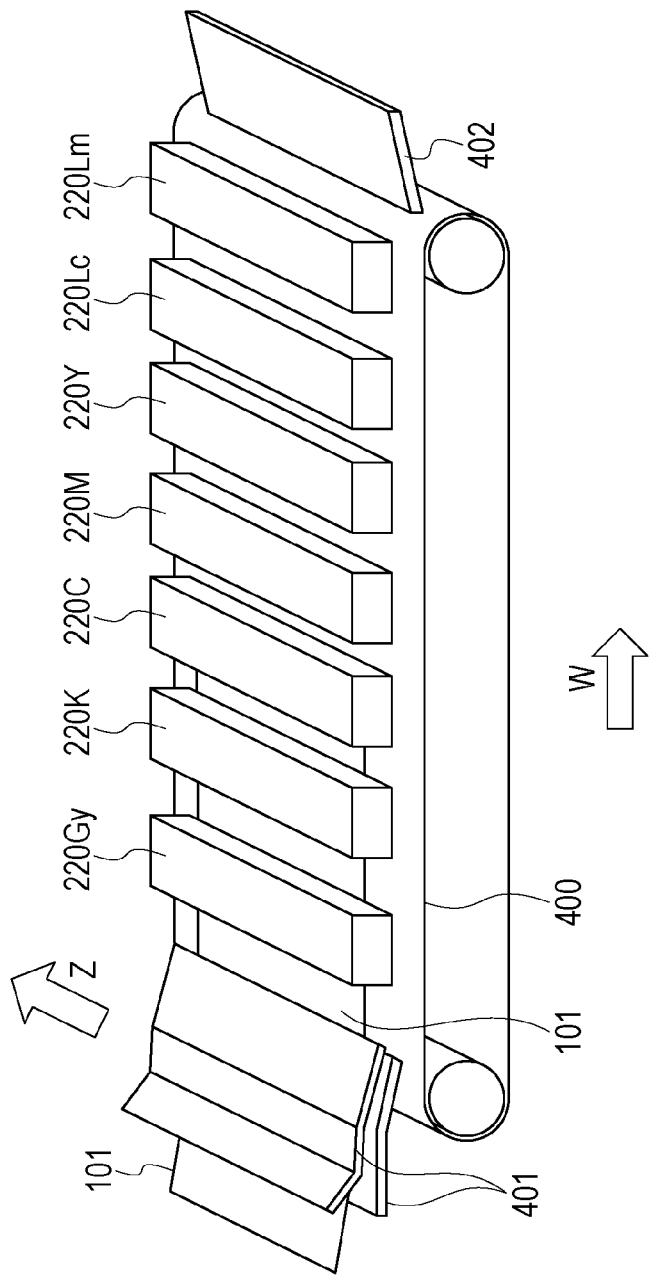
FIG. 26 is a perspective view of an image recording apparatus according to a fifth embodiment.

FIG. 26 is a partial side view illustrating the internal configuration of a recording apparatus according to this embodiment.

Seven recording heads 220Gy, 220K, 220C, 220M, 220Y, 220Lc, and 220Lm are configured to eject gray ink, black ink, cyan ink, magenta ink, yellow ink, light cyan ink, and light magenta ink, respectively. Each of the recording heads 220Gy, 220K, 220C, 220M, 220Y, 220Lc, and 220Lm has four arrays of ejection ports (not illustrated) arranged in a Z direction, each array having a predetermined number of ejection ports, through which the corresponding one of the gray ink, black ink, cyan ink, magenta ink, yellow ink, light cyan ink, and light magenta ink is ejected. Each ejection port array has a length in the Z direction that is greater than or equal to the length of a recording medium 101 in the Z direction so that recording on the entire surface of the recording medium 101 in the Z direction can be performed.

A conveyance belt 400 is a belt that conveys the recording medium 101. The conveyance belt 400 is rotated in a W direction perpendicular to the Z direction by a feed conveyor 401 and a discharge conveyor 402.

The recording medium 101 is fed by the feed conveyor 401, and is conveyed along the conveyance belt 400 in the W direction.

In this embodiment, binary data 1610 is generated by using a process similar to the process of image processing illustrated in FIG. 15 according to the second embodiment. Then, the mask patterns illustrated in FIGS. 20A, 20B, 20C, and 20D are applied to the four ejection port arrays that eject ink of the same color in each recording head to distribute the binary data 1610 into the four ejection port arrays.

With the configuration described above, a recording apparatus configured to perform recording through a single scanning and recording operation on a unit area on a recording medium may achieve recording with a relatively high dot adjacency for the Lm or Gy ink having a low dot height even when the CMYK ink is ejected a small amount. Accordingly, recording with the effect of thin-film interference reduced and the change in color tint suppressed is achievable.

In addition, the formation of an image can be completed with a single scanning and recording operation. Thus, the time required for recording can be reduced.

In this embodiment, the length of each ejection port array in the Z direction corresponds to the length corresponding to the width of a recording medium. Alternatively, an elongated head formed by arranging a plurality of short ejection port arrays in the Z direction, called a joint head, may be used as a recording head.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the embodiments described above assume that gray ink and light magenta ink have a low dot height and will cause thin-film interference, other implementations may also be used. For example, in a case where the dot height of cyan ink is low enough to cause thin-film interference, quantization may be performed so that the dot adjacency for the cyan ink is relatively reduced (so that the dispersibility of the cyan ink is increased), thus achieving the advantages of the present disclosure.

In the embodiments described above, furthermore, multi-valued data input to a first dithering process is quantized by using a single dither pattern designed so that dot adjacency is increased. Alternatively, the multi-valued data may be quantized by using two or more different types of dither patterns as long as the requirements of the respective embodiments are satisfied. For example, a different dither pattern may be used for each color of ink may be used. Similarly, multi-valued data input to a second dithering process may also be quantized by using two or more types of dither patterns designed so that dot adjacency is decreased.

In the embodiments described above, furthermore, the same mask pattern as the mask pattern to be applied to binary data corresponding to the Lm or Gy ink having a low dot height is applied to binary data corresponding to the CMYKLc ink having a high dot height to distribute binary data. Other implementations may also be used. That is, a different mask pattern may be appropriately used for binary data corresponding to the CMYKLc ink. Additionally, the mask pattern to be applied to binary data corresponding to the Lm ink and the mask pattern to be applied to binary data corresponding to the Gy ink may not necessarily be the same, and different mask patterns may be used as long as the requirements of the respective embodiments are satisfied.

In the embodiments described above, furthermore, the sum of the gradation values of CMYK data is calculated as the total gradation value of CMYK data. Alternatively, a weighting coefficient may be assigned to a certain type of ink that particularly reduces the effect of thin-film interference. For example, if cyan ink has a function of particularly significantly suppressing thin-film interference, a value obtained by multiplying the recording duty for the cyan ink by a value greater than 1 as a weighting coefficient may be used to calculate the sum of the gradation values of CMYK data.

Furthermore, the first through fourth embodiments described above assume that binary data generated through the dithering process is distributed into a plurality of scans using the masking process, and the fifth embodiment assumes that binary data generated through the dithering process is distributed into a plurality of recording heads. Other implementations may also be used. For example, even in a case where there is a single ejection port array for ejecting a certain color of ink and recording is performed with a single scan, a dither pattern designed so that dot adjacency is increased is applied to Lm or Gy data when the sum of the gradation values of CMYK data is low, thus allowing the dot height of the Lm or Gy ink to be increased to some extent. Accordingly, the effect of thin-film interference may be suppressed.

In the first through fourth embodiments described above, furthermore, binary data is distributed into individual scans by using mask patterns. Alternatively, any device capable of recording on each pixel, other than a mask pattern, may be used. For example, an image recording apparatus may include a distribution circuit configured to sequentially distribute recording data for each pixel into a plurality of buffers each corresponding to one of a plurality of scanning and recording operations, to determine during which scanning and recording operation the recording on each pixel is to be performed. The distribution circuit can control where in the sequence of scans the ejection of ink into each pixel takes place.

An image processing apparatus, an image processing method, and an image recording apparatus according to embodiments of the present disclosure enable recording with a reduced change in color tint due to thin-film interference even when multiple types of ink having different dot heights are used.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-079019, filed Apr. 7, 2014, which is hereby incorporated by reference herein in its entirety.

What is claimed is:

1. An image processing apparatus for processing multi-valued data corresponding to an image to be recorded in a unit area on a recording medium to record an image in the unit area during each of a plurality of relative scans of a recording head across the unit area in a scanning direction, the recording head being configured to eject at least ink of a first color containing a pigment and ink of a second color containing a pigment, in accordance with recording data that specifies ejection or non-ejection of each of the ink of the first color and the ink of the second color to each of a plurality of pixel areas each having a plurality of pixels within the unit area, the image processing apparatus comprising:

an acquisition unit configured to acquire information concerning gradation values in the multi-valued data, each of the gradation values corresponding to one of the ink of the first color and the ink of the second color; and a quantization unit configured to quantize the multi-valued data to generate binary data that specifies, for each of the plurality of pixels, ejection or non-ejection of each of the ink of the first color and the ink of the second color to each of the plurality of pixel areas, wherein a dot formed by applying the ink of the second color to the recording medium a predetermined amount has a lower height than a dot formed by applying the ink of the first color to the recording medium the predetermined amount, and the quantization unit quantizes the multi-valued data corresponding to the ink of the second color so that an average of numbers of adjacent pixels among pixels within the unit area for which ejection of the ink of the second color is specified by the binary data in a case where the gradation value in the multi-valued data corresponding to the ink of the second color, which is acquired by the acquisition unit, is a first value and in a case where the gradation value in the multi-valued data corresponding to the ink of the first color, which is acquired by the acquisition unit, is a second value is larger than an average of numbers of adjacent pixels among pixels for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is a third value higher than the second value.

2. The image processing apparatus according to claim 1, wherein the quantization unit quantizes the multi-valued data in accordance with a dithering technique by using a dither pattern in which a threshold value used to determine ejection or non-ejection of ink to each of the plurality of pixel areas is defined for each of the plurality of pixels.

3. The image processing apparatus according to claim 2, wherein
the quantization unit quantizes (i) the multi-valued data corresponding to the ink of the second color by using a first dither pattern in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is the second value, and (ii) the multi-valued data corresponding to the ink of the second color by using a second dither pattern in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is the third value, each of the first dither pattern and the second dither pattern comprising the dither pattern, and
an average of numbers of adjacent pixels within the first dither pattern for which a threshold value lower than a predetermined value is defined is larger than an average of numbers of adjacent pixels within the second dither pattern for which a threshold value lower than the predetermined value is defined.

4. The image processing apparatus according to claim 3, wherein the quantization unit quantizes the multi-valued data corresponding to the ink of the first color by using the second dither pattern.

5. The image processing apparatus according to claim 1, further comprising:
a distribution unit configured to distribute the binary data generated by the quantization unit into the plurality of scans to generate the recording data,
wherein the distribution unit distributes the binary data by using a plurality of mask patterns each corresponding to one of the plurality of scans and each having a recording-permitting pixel for which ejection of ink is permitted and a non-recording-permitting pixel for which ejection of ink is not permitted.

6. The image processing apparatus according to claim 5, wherein
the plurality of mask patterns at least include a first mask pattern corresponding to a first scan among the plurality of scans, and a second mask pattern corresponding to a second scan different from the first scan, and
the unit area includes a plurality of pixels for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is the second value, the plurality of pixels at least including a first pixel and a second pixel that are adjacent to each other, wherein (i) in the first mask pattern, the first pixel corresponds to the recording-permitting pixel, and the second pixel corresponds to the non-recording-permitting pixel, and (ii) in the second mask pattern, the first pixel corresponds to the non-recording-permitting pixel, and the second pixel corresponds to the recording-permitting pixel.

7. The image processing apparatus according to claim 1, wherein the quantization unit quantizes the multi-valued data corresponding to the ink of the second color so that an average of numbers of adjacent pixels among pixels within the unit area for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is a fourth value lower than the second value is larger than an average of numbers of adjacent pixels among pixels for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is the second value.

8. The image processing apparatus according to claim 1, wherein the second color has substantially a same hue as the first color, and has a lower density than the first color.

9. The image processing apparatus according to claim 1, further comprising the recording head.

10. An image processing apparatus for processing multi-valued data corresponding to an image to be recorded in a unit area on a recording medium to record an image in the unit area during each of a plurality of relative scans of a recording head across the unit area in a scanning direction, the recording head being configured to eject ink of a plurality of colors containing a pigment, in accordance with recording data that specifies ejection or non-ejection of the ink of each of the plurality of colors to each of a plurality of pixel areas each having a plurality of pixels within the unit area, the image processing apparatus comprising:
a determination unit configured to determine whether the multi-valued data is multi-valued data corresponding to ink of a type included in a first group for which a dot formed by applying the ink to the recording medium a predetermined amount has a higher height than a predetermined value, or multi-valued data corresponding to ink of a type included in a second group for which a dot formed by applying the ink to the recording medium the predetermined amount has a lower height than the predetermined value;
an acquisition unit configured to acquire information concerning gradation values in the multi-valued data, each of the gradation values corresponding to the ink of one of the plurality of colors; and
a quantization unit configured to quantize the multi-valued data to generate binary data that specifies, for each of the plurality of pixels, ejection or non-ejection of the ink of each of the plurality of colors to each of the plurality of pixel areas, wherein
the quantization unit quantizes the multi-valued data corresponding to the ink of the plurality of colors so that an average of numbers of adjacent pixels among pixels within the unit area for which ejection of ink of a predetermined color included in the second group is specified by the binary data in a case where the gradation value in the multi-valued data corresponding to the ink of the predetermined color, which is acquired by the acquisition unit, is a first value and in a case where a total gradation value in the multi-valued data corresponding to ink of colors included in the first group is a second value is larger than an average of numbers of adjacent pixels among pixels for which ejection of the ink of the predetermined color is specified by the binary data in a case where the gradation value in the multi-valued data corresponding to the ink of the predetermined color, which is acquired by the acquisition unit, is the first value and in a case where a total gradation value in the multi-valued data corresponding to the ink of the colors included in the first group is a third value higher than the second value.

11. An image processing apparatus for processing multi-valued data corresponding to an image to be recorded in a unit area on a recording medium to record an image in the unit area during a relative scan between the recording medium and a recording head group at least including a first recording head and a second recording head, the first recording head having a plurality of first ejection port arrays each configured to eject ink of a first color containing a pigment, the second recording head having a plurality of second ejection port arrays each configured to eject ink of a second color containing a pigment, in accordance with recording data that specifies ejection or non-ejection of each of the ink of the first color and the ink of the second color to each of a plurality of pixel areas each having a plurality of pixels within the unit area, the image processing apparatus comprising:
    an acquisition unit configured to acquire information concerning gradation values in the multi-valued data, each of the gradation values corresponding to one of the ink of the first color and the ink of the second color; and
    a quantization unit configured to quantize the multi-valued data to generate binary data that specifies, for each of the plurality of pixels, ejection or non-ejection of each of the ink of the first color and the ink of the second color to each of the plurality of pixel areas, wherein
    a dot formed by applying the ink of the second color to the recording medium a predetermined amount has a lower height than a dot formed by applying the ink of the first color to the recording medium the predetermined amount, and
    the quantization unit quantizes the multi-valued data corresponding to the ink of the second color so that an average of numbers of adjacent pixels among pixels within the unit area for which ejection of the ink of the second color is specified by the binary data in a case where the gradation value in the multi-valued data corresponding to the ink of the second color, which is acquired by the acquisition unit, is a first value and in a case where the gradation value in the multi-valued data corresponding to the ink of the first color, which is acquired by the acquisition unit, is a second value is larger than an average of numbers of adjacent pixels among pixels for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is a third value higher than the second value.

12. An image processing apparatus for processing multi-valued data corresponding to an image to be recorded in a unit area on a recording medium to record an image in the unit area during each of a plurality of relative scans of a recording head across the unit area in a scanning direction, the recording head being configured to eject at least ink of a first color containing a pigment and ink of a second color containing a pigment, in accordance with recording data that specifies ejection or non-ejection of each of the ink of the first color and the ink of the second color to each of a plurality of pixel areas each having a plurality of pixels within the unit area, the image processing apparatus comprising:
    an acquisition unit configured to acquire information concerning gradation values in the multi-valued data, each of the gradation values corresponding to one of the ink of the first color and the ink of the second color; and
    a quantization unit configured to quantize the multi-valued data in accordance with a dithering technique by using a dither pattern in which a threshold value used to determine ejection or non-ejection of ink to each of the plurality of pixel areas is defined for each of the plurality of pixels, to generate binary data that specifies, for each of the plurality of pixels, ejection or non-ejection of each of the ink of the first color and the ink of the second color to each of the plurality of pixel areas, wherein
    a dot formed by applying the ink of the second color to the recording medium a predetermined amount has a lower height than a dot formed by applying the ink of the first color to the recording medium the predetermined amount,
    the quantization unit quantizes (i) the multi-valued data corresponding to the ink of the second color by using a first dither pattern in a case where the gradation value in the multi-valued data corresponding to the ink of the second color, which is acquired by the acquisition unit, is a first value and in a case where the gradation value in the multi-valued data corresponding to the ink of the first color, which is acquired by the acquisition unit, is a second value, and (ii) the multi-valued data corresponding to the ink of the second color by using a second dither pattern in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is a third value higher than the second value, each of the first dither pattern and the second dither pattern comprising the dither pattern, and
    an average of numbers of adjacent pixels within the first dither pattern for which a threshold value lower than a predetermined value is defined is larger than an average of numbers of adjacent pixels within the second dither pattern for which a threshold value lower than the predetermined value is defined.

13. The image processing apparatus according to claim 12, further comprising:
    a distribution unit configured to distribute the binary data generated by the quantization unit into the plurality of scans to generate the recording data, wherein
    the distribution unit distributes the binary data by using a plurality of mask patterns each corresponding to one of the plurality of scans and each having a recording-permitting pixel for which ejection of ink is permitted and a non-recording-permitting pixel for which ejection of ink is not permitted, the plurality of mask patterns at least including a first mask pattern corresponding to a first scan among the plurality of scans and a second mask pattern corresponding to a second scan different from the first scan, and the first dither pattern includes pixels for which a threshold value lower than the predetermined value is defined, the pixels having a first pixel and a second pixel that are adjacent to each other, wherein (i) in the first mask pattern, the first pixel corresponds to the recording-permitting pixel, and the second pixel corresponds to the non-recording-permitting pixel, and (ii) in the second mask pattern, the first pixel corresponds to the non-recording-permitting pixel, and the second pixel corresponds to the recording-permitting pixel.

14. An image processing apparatus for processing multi-valued data corresponding to an image to be recorded in a unit area on a recording medium to record an image in the unit area during each of a plurality of relative scans of a recording head across the unit area in a scanning direction, the recording head being configured to eject at least ink of a first color containing a pigment and ink of a second color containing a pigment, in accordance with recording data that specifies ejection or non-ejection of each of the ink of the first color and the ink of the second color to each of a plurality of pixel areas each having a plurality of pixels within the unit area, the image processing apparatus comprising:

an acquisition unit configured to acquire information concerning gradation values in the multi-valued data, each of the gradation values corresponding to one of the ink of the first color and the ink of the second color; and a quantization unit configured to quantize the multi-valued data to generate binary data that specifies, for each of the plurality of pixels, ejection or non-ejection of each of the ink of the first color and the ink of the second color to each of the plurality of pixel areas, wherein a dot formed by applying the ink of the second color to the recording medium a predetermined amount has a lower height than a dot formed by applying the ink of the first color to the recording medium the predetermined amount, and the quantization unit quantizes the multi-valued data corresponding to the ink of the second color so that a dispersibility of a pixel within the unit area for which ejection of the ink of the second color is specified by the binary data in a case where the gradation value in the multi-valued data corresponding to the ink of the second color, which is acquired by the acquisition unit, is a first value and in a case where the gradation value in the multi-valued data corresponding to the ink of the first color, which is acquired by the acquisition unit, is a second value is lower than a dispersibility of a pixel for which ejection of the ink of the second color is specified by the binary data in a case where the gradation value in the multi-valued data corresponding to the ink of the second color, which is acquired by the acquisition unit, is the first value and in a case where the gradation value in the multi-valued data corresponding to the ink of the first color, which is acquired by the acquisition unit, is a third value higher than the second value.

15. An image processing method for processing multi-valued data corresponding to an image to be recorded in a unit area on a recording medium to record an image in the unit area during each of a plurality of relative scans of a recording head across the unit area in a scanning direction, the recording head being configured to eject at least ink of a first color containing a pigment and ink of a second color containing a pigment, in accordance with recording data that specifies ejection or non-ejection of each of the ink of the first color and the ink of the second color to each of a plurality of pixel areas each having a plurality of pixels within the unit area, the image processing method comprising:

an acquiring step of acquiring information concerning gradation values in the multi-valued data, each of the gradation values corresponding to one of the ink of the first color and the ink of the second color; and a quantizing step of quantizing the multi-valued data to generate binary data that specifies, for each of the plurality of pixels, ejection or non-ejection of each of the ink of the first color and the ink of the second color to each of the plurality of pixel areas, wherein a dot formed by applying the ink of the second color to the recording medium a predetermined amount has a lower height than a dot formed by applying the ink of the first color to the recording medium the predetermined amount, and the quantizing step quantizes the multi-valued data corresponding to the ink of the second color so that an average of numbers of adjacent pixels among pixels within the unit area for which ejection of the ink of the second color is specified by the binary data in a case where the acquired gradation value in the multi-valued data corresponding to the ink of the second color is a first value and in a case where the acquired gradation value in the multi-valued data corresponding to the ink of the first color is a second value is larger than an average of numbers of adjacent pixels among pixels for which ejection of the ink of the second color is specified by the binary data in a case where the acquired gradation value in the multi-valued data corresponding to the ink of the second color is the first value and in a case where the acquired gradation value in the multi-valued data corresponding to the ink of the first color is a third value higher than the second value.

16. An image processing method for processing multi-valued data corresponding to an image to be recorded in a unit area on a recording medium to record an image in the unit area during a relative scan between the recording medium and a recording head group at least including a first recording head and a second recording head, the first recording head having a plurality of first ejection port arrays each configured to eject ink of a first color containing a pigment, the second recording head having a plurality of second ejection port arrays each configured to eject ink of a second color containing a pigment, in accordance with recording data that specifies ejection or non-ejection of each of the ink of the first color and the ink of the second color to each of a plurality of pixel areas each having a plurality of pixels within the unit area, the image processing method comprising:

an acquiring step of acquiring information concerning gradation values in the multi-valued data, each of the gradation values corresponding to one of the ink of the first color and the ink of the second color; and a quantizing step of quantizing the multi-valued data to generate binary data that specifies, for each of the plurality of pixels, ejection or non-ejection of each of the ink of the first color and the ink of the second color to each of the plurality of pixel areas, wherein a dot formed by applying the ink of the second color to the recording medium a predetermined amount has a lower height than a dot formed by applying the ink of the first color to the recording medium the predetermined amount, and the quantizing step quantizes the multi-valued data corresponding to the ink of the second color so that an average of numbers of adjacent pixels among pixels within the unit area for which ejection of the ink of the second color is specified by the binary data in a case where the acquired gradation value in the multi-valued data corresponding to the ink of the second color is a first value and in a case where the acquired gradation value in the multi-valued data corresponding to the ink of the first color is a second value is larger than an average of numbers of adjacent pixels among pixels for which ejection of the ink of the second color is specified by the binary data in a case where the acquired gradation value in the multi-valued data corresponding to the ink of the second color is the first value and in a case where the gradation value in the multi-valued data corresponding to the ink of the first color is a third value higher than the second value.

17. An image recording apparatus for recording an image in a unit area on a recording medium by ejecting at least ink of a first color containing a pigment and ink of a second color containing a pigment to the unit area, the image recording apparatus comprising:
- a recording head configured to eject at least the ink of the first color and the ink of the second color;
- a scanning unit configured to perform a plurality of relative scans of the recording head across the unit area in a scanning direction;
- a control unit configured to perform control to eject each of the ink of the first color and the ink of the second color to each pixel area having a plurality of pixels within the unit area during each of the plurality of scans performed by the scanning unit; and
- an acquisition unit configured to acquire information concerning an amount by which each of the ink of the first color and the ink of the second color is ejected to the unit area, wherein
- a dot formed by applying the ink of the second color to the recording medium a predetermined amount has a lower height than a dot formed by applying the ink of the first color to the recording medium the predetermined amount, and
- the control unit performs control to eject the ink of the second color so that an average of numbers of adjacent pixel areas among pixel areas within the unit area to which the ink of the second color is ejected during a plurality of scans in a case where the amount by which the ink of the second color is ejected, which is acquired by the acquisition unit, is set to a first value and in a case where the amount by which the ink of the first color is ejected, which is acquired by the acquisition unit, is set to a second value is larger than an average of numbers of adjacent pixel areas among pixel areas within the unit area to which the ink of the second color is ejected during a plurality of scans in a case where the amount by which the ink of the second color is ejected, which is acquired by the acquisition unit, is set to the first value and in a case where the amount by which the ink of the first color is ejected, which is acquired by the acquisition unit, is set to a third value higher than the second value.

* * * * *